United States Patent [19]

Tanaka et al.

[11] Patent Number: 5,029,001
[45] Date of Patent: Jul. 2, 1991

[54] NTSC COMPATIBLE TV SIGNAL TRANSMITTING SYSTEM FOR IMPROVING VERTICAL RESOLUTION

[75] Inventors: Yutaka Tanaka; Nobuyuki Asakura, both of Kanagawa, Japan

[73] Assignee: Sony Corporation, Tokyo, Japan

[21] Appl. No.: 81,717

[22] Filed: Aug. 4, 1987

[30] Foreign Application Priority Data

Aug. 14, 1986 [JP] Japan ................. 61-190995
Nov. 22, 1986 [JP] Japan ................. 61-279217

[51] Int. Cl.⁵ .............................. H09N 7/01
[52] U.S. Cl. ...................... 358/140; 358/160
[58] Field of Search ............ 358/140, 160, 166, 22

[56] References Cited

U.S. PATENT DOCUMENTS

| | | | |
|---|---|---|---|
| 3,534,170 | 10/1970 | Davies | 358/149 |
| 4,125,862 | 11/1978 | Catano | 358/140 |
| 4,240,101 | 12/1980 | Michael et al. | 358/140 X |
| 4,300,162 | 11/1981 | Robers | 358/160 |
| 4,386,367 | 5/1983 | Peterson et al. | 358/140 |
| 4,412,251 | 10/1983 | Tanaka et al. | . |
| 4,426,661 | 1/1984 | Okada et al. | . |
| 4,449,143 | 5/1984 | Dischert et al. | 358/140 X |
| 4,451,848 | 5/1984 | Okada et al. | . |
| 4,471,381 | 9/1984 | Kasuga et al. | 358/140 |
| 4,509,071 | 4/1985 | Fujimura et al. | . |
| 4,524,379 | 6/1985 | Okada et al. | . |
| 4,539,592 | 9/1985 | Tanaka et al. | 358/140 |
| 4,605,950 | 8/1986 | Goldberg et al. | 358/11 |
| 4,626,895 | 12/1986 | Reitmeier | . |
| 4,633,293 | 12/1986 | Powers | 358/140 X |
| 4,658,293 | 4/1987 | Arai et al. | 358/140 |
| 4,672,445 | 6/1987 | Casey et al. | 358/140 |
| 4,673,978 | 6/1987 | Dischert et al. | 358/140 |
| 4,703,353 | 10/1987 | David | 358/140 |
| 4,723,163 | 2/1988 | Skinner | 358/140 |
| 4,731,651 | 3/1988 | Matsumoto et al. | . |
| 4,733,300 | 3/1988 | Sugiyama et al. | 358/140 |
| 4,752,826 | 6/1988 | Barnett | 358/140 |
| 4,761,686 | 8/1988 | Willis | 358/160 |
| 4,764,964 | 8/1988 | Tanaka et al. | . |
| 4,779,131 | 10/1988 | Matsumoto et al. | . |
| 4,811,094 | 3/1989 | Sakata | 358/141 X |

OTHER PUBLICATIONS

J. E. E. Journal of Electronic Engineering, vol. 22, No. 225, Sep. 1985, pp. 80–85, Tokyo, Japan; Hiroshi Shibata: "Asahi Broadcasting Develops System for Improved TV Image Resolution."
Patent Abstracts of Japan, vol. 10, No. 363 (E–461), Dec. 5, 1986; and JP–A–61 159 881 (Asahi Hoso K.K.), Jul. 19, 1986.

*Primary Examiner*—Victor R. Kostak
*Attorney, Agent, or Firm*—Philip M. Shaw, Jr.

[57] ABSTRACT

A television signal processing system so arranged as to alternately transmit television signals corresponding to a plurality of continuous scanning lines in the vertical direction at every field in the form of a single block or a plurality of blocks, whereby maintaining the compatibility with the existing standard system, the block scanning can easily be converted into the sequential scanning with line frequencies doubled. Thus, the vertical resolution of a reproduced picture can be improved.

14 Claims, 20 Drawing Sheets

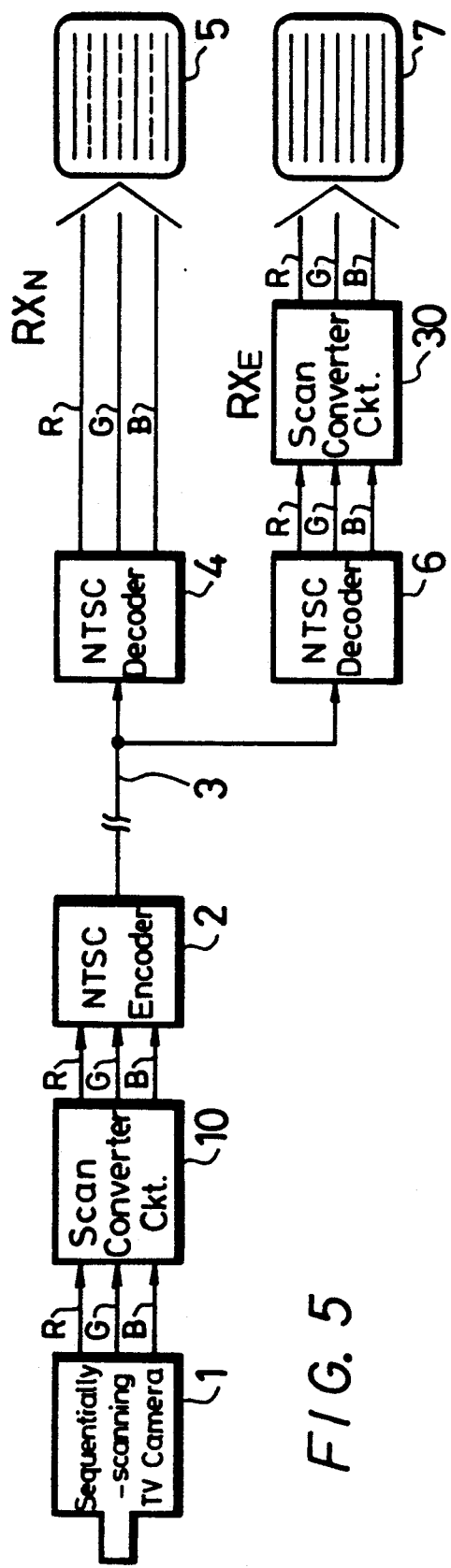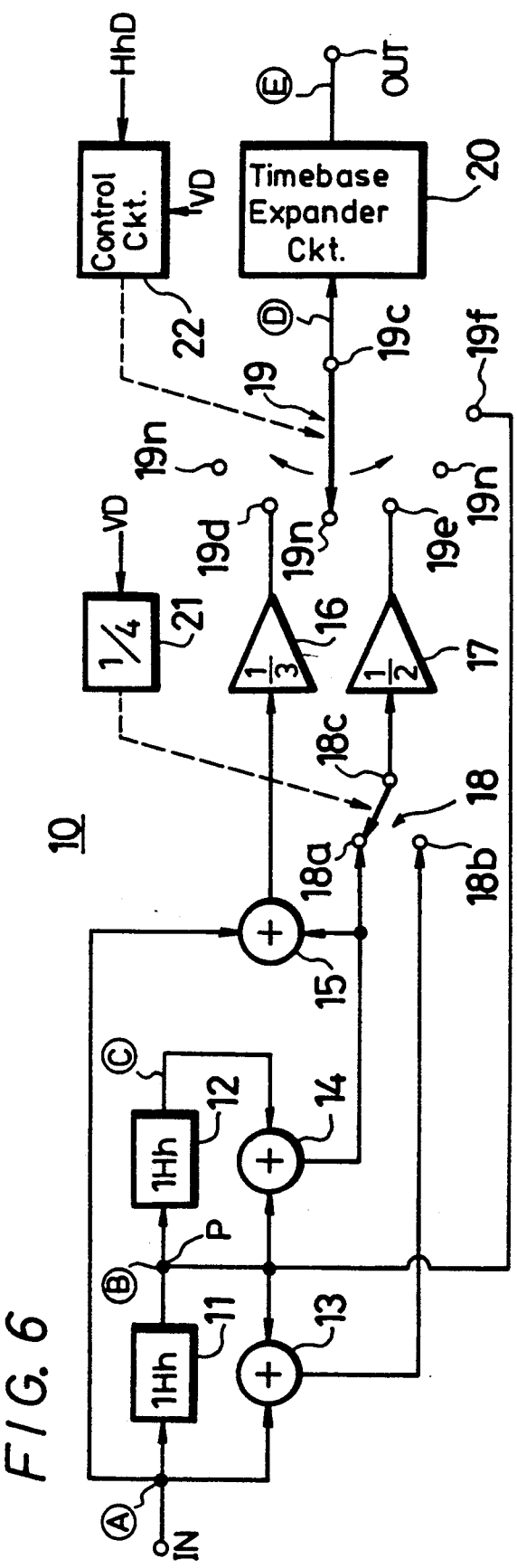
FIG. 5
FIG. 6

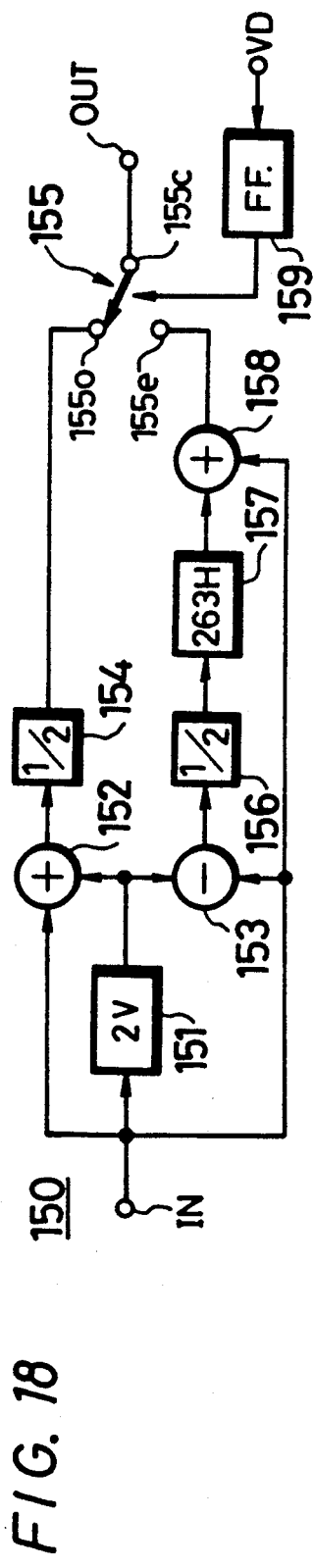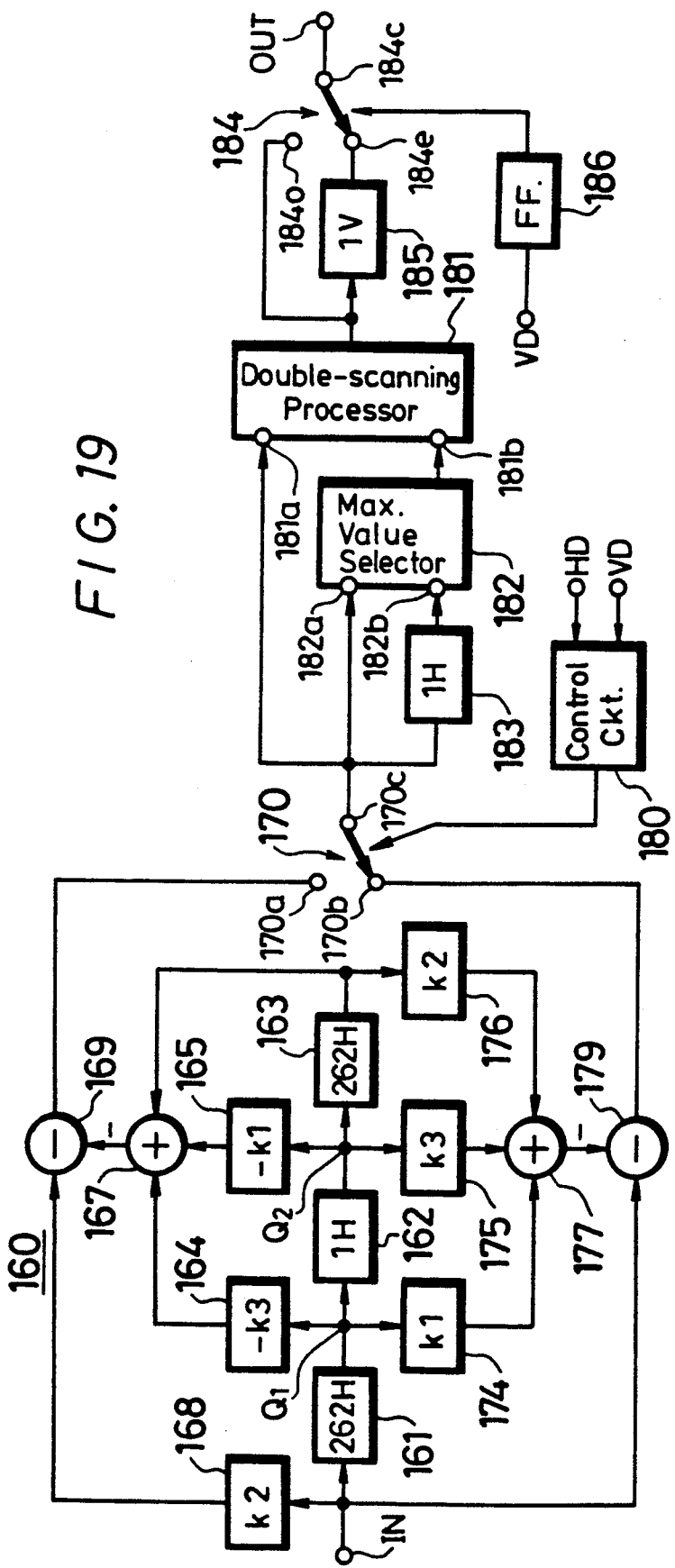
FIG. 18
FIG. 19

NTSC COMPATIBLE TV SIGNAL TRANSMITTING SYSTEM FOR IMPROVING VERTICAL RESOLUTION

BACKGROUND OF THE INVENTION

1. Field of the Invention

The present invention relates generally to television signal processing systems and, more particularly, is directed to a television signal processing system for improving the vertical resolution of a reproduced picture.

2. Description of the Prior Art In accordance with the existing NTSC system, as shown in FIG. 1A, at the pick-up side only odd-numbered scanning lines such as $l_{11}$, $l_{13}$, . . . are scanned during the odd field period, while only even-numbered scanning lines such as $l_{22}$, $l_{24}$, . . . are scanned during the even field period whereby the 2:1 interlaced scanning for one frame of 525 scanning lines is carried out by a pair of odd and even field periods to thereby sequentially transmit television signals $S_{11}$, $S_{13}$, . . . ; $S_{22}$, $S_{24}$, . . . corresponding to picture information on the respective scanning lines and then such television signals are displayed on a picture tube or the like. According to such a scanning technique, the transmission band can be reduced by about ½.

In the case of this interlaced hereinabove, however, there is a time difference of 1/30 of a second that the picture information on a desired scanning line, for example, $l_{13}$ is displayed on the picture screen of the picture tube until the picture information on the scanning line $l_{33}$ is displayed at the same position of the picture screen. As a result, there is optical interference with the picture information displayed on the intermediate position therebetween or the adjacent scanning lines $l_{22}$ and $l_{24}$ thus causing a so-called inter-line flicker which causes the vertical resolution of the reproduced picture to be lowered.

This inter-line flicker becomes more conspicuous on the picture screens of present day television receivers which have brighter picture tubes.

In order to avoid lowering the vertical resolution of the reproduced picture due to the inter-line flicker, as shown in FIG. 1B, the interlaced scanning is carried out such that picture information of, for example, only the odd-numbered scanning lines $l_{11}$, $l_{13}$, . . . are transmitted at every field. However, according to this interlaced scanning, the picture information of, for example, the even-numbered scanning lines $l_{22}$, $l_{24}$, . . . are not transmitted so that the vertical resolution of the reproduced picture is essentially low.

It is also known that if the scanning frequency of the interlaced scanning system is selected to be 31.5 kHz, which is twice the scanning frequency of 15.75 kHz of the existing system, and picture information consisting of 525 scanning lines is displayed at every 1/60 second, the inter-line flicker can be removed and the vertical resolution of the reproduced picture can be improved. In this case, however, a transmission band width twice as wide as that of the existing system becomes necessary and this system is not compatible with the existing television transmitting system.

Therefore, in order to improve the vertical resolution of the reproduced picture lowered by the above-mentioned inter-line flicker, studies have been undertaken of an IDTV (improved definition TV) in which the existing broadcasting system is not altered and the interlaced scanning is carried out at the television receiver side and an EDTV (extended definition TV) in which compatibility with the existing broadcasting system is maintained and the broadcasting system is improved and altered.

The fundamental technology common to such IDTV and EDTV is based upon the sequential-scanning/double-scanning display method in which signals corresponding to the scanning lines whose signals are not transmitted are interpolated at the receiving side. Accordingly, in the case of a still picture, the complete interpolation of a signal is possible.

However, in case of a real, moving picture (i.e. alive picture), the picture quality of mainly the outline portion of the reproduced picture is deteriorated and the smooth motion of the real moving picture is lost. In order to diminish the deterioration of the picture quality of the real moving picture, it may be considered that upon carrying out the sequential scanning, the interpolation between the fields is carried out for the still picture portion whereas the interpolation within the field is carried out for the real moving picture portion. In this case, it becomes necessary to provide a judging circuit for judging whether the picture portion to be reproduced is the still picture portion or the real moving picture portion.

Since the interlaced scanning can be regarded as a two-dimensional sampling in the time-to-vertical frequency area, if a picture to be reproduced is a still picture, the scanning frequency $f_{IS}$ and the higher harmonic wave thereof are expressed as shown in FIG. 2A. For this reason, a conventional real moving picture judging circuit is one which fundamentally uses a vertical comb filter having the characteristic shown in FIG. 2B to judge the picture to be reproduced as a still picture when the frame difference output is zero. However, according to the judging circuit based on the frame difference output, it is not possible to detect a real moving picture with a frequency of 30 Hz. Even when a field difference output is used to detect a real moving picture, in the case of the interlaced scanning system, no sampling point originally exists at the position shown by a cross mark x in FIG. 2A so that the real moving picture can not be judged by the field difference output.

Further, as one system of the above EDTV, there is known a system called "Ivision" which is seen in the technical report of The Journal of the Institute of Television Engineers of Japan, No. 21, Vol. 9 (Oct. 1985).

According to this "Ivision" system, as shown in FIG. 3A, an image is picked up by sequential scanning of 525 lines during one frame period of 1/30 second and then, as shown in FIG. 3B, the television signal is divided into television signals $S_{11}$, $S_{13}$, . . . corresponding to the odd-numbered scanning lines $l_{11}$, $l_{13}$, . . . and television signals $S_{12}$, $S_{14}$, . . . corresponding to the even-numbered scanning lines $l_{12}$, $l_{14}$ . . . , or converted into an interlaced scanning signal substantially equal to a signal according to the NTSC system, and then broadcast. In the existing television receiver, this interlaced scanning signal is displayed as it is, whereas in the television receiver of the "Ivision" system, as shown in FIG. 3C, television signals which are not transmitted (for example, television signals $S_{12}$, $S_{14}$, . . . in the first field and television signals $S_{11}$, $S_{13}$, . . . in the second field, etc.) are interpolated within the frame and then sequential scanning is presented, thus the television signal of the same frame being displayed twice each during the period of 1/30 second.

According to this system, on the basis of the simple interpolation of the scanning lines, the vertical resolution of the reproduced picture can be improved by a relatively simple circuit arrangement.

However, in the case of the "Ivision" system, the picture is picked up by the interlaced scanning at every 1/30 second so that both the television receiver of the existing television system and the television receiver of the "Ivision" system can not avoid a problem of deteriorated picture quality such as when a real moving picture can not be moved smoothly and so on.

OBJECTS AND SUMMARY OF THE INVENTION

Accordingly, it is an object of this invention to provide an improved television signal processing system.

It is another object of this invention to provide a television signal processing system which can improve the vertical resolution of a reproduced picture while being compatible with the existing NTSC system.

It is a further object of this invention to provide a television signal processing system which can prevent the picture quality of even a moving picture from being deteriorated.

It is yet further object of this invention to provide a television signal processing system which can reduce the so-called inter-line flicker occurring in the television receiver of the existing television transmitting systems.

According to one aspect of the present invention, there is provided a television signal processing system comprising:

a) receiving means for receiving a television signal having a plurality of fields, each having a plurality of scanning lines;

b) combining means connected to the receiving means for combining a predetermined number of the scanning lines in one field and transmitting the combined output as one scanning line of the one field; and c) dividing means connected to the receiving means for dividing the same number (of lines) as the predetermined number of scanning lines in another field, corresponding to the predetermined number of scanning lines in the one field, into a plurality of groups and transmitting them as a plurality of scanning lines of the other field.

According to another aspect of the present invention, there is provided a method for processing a television signal comprising the steps of:

a) receiving a television signal having a plurality of scanning lines;

b) combining a predetermined number of scanning lines in one field of the received television signal and transmitting the combined output as one scanning line of the one field; and c) dividing the same number (of lines) as the predetermined number of scanning lines in another field of the received television signal corresponding to the predetermined number of scanning lines in the one field into a plurality of groups and transmitting them as a plurality of scanning lines of the other field.

These and other objects, features and advantages of the present invention will become apparent from the following detailed description of the preferred embodiments that are to be read in conjunction with the accompanying drawings, throughout which like reference numerals identify like elements and parts.

BRIEF DESCRIPTION OF THE DRAWINGS

FIG. 5 is a block diagram showing an embodiment of a television signal processing system according to the present invention;

FIG. 6 is a block diagram illustrating an arrangement of a sequential scanning/block scanning converter of the present invention shown in FIG. 5;

FIG. 18 is a block diagram of a color signal eliminating circuit and FIG. 19 is a block diagram showing a real moving picture detecting circuit of the further embodiment of the present invention, respectively;

DESCRIPTION OF THE PREFERRED EMBODIMENTS

The present invention will now be described in detail with reference to the drawings. Initially, the generation of a signal to be transmitted by an embodiment of a television signal processing system according to the present invention will be described with reference to FIGS. 4 and 5.

Figure 1A:
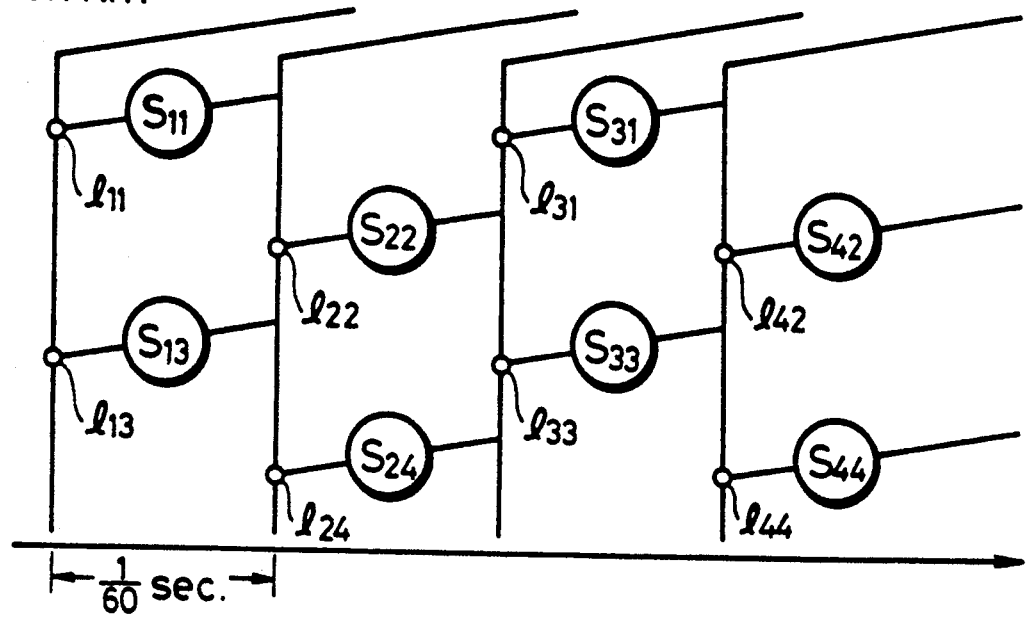
FIGS. 1A and 1B are schematic representations showing an example of an arrangement of a conventional television signal, respectively.
Figure 1B:
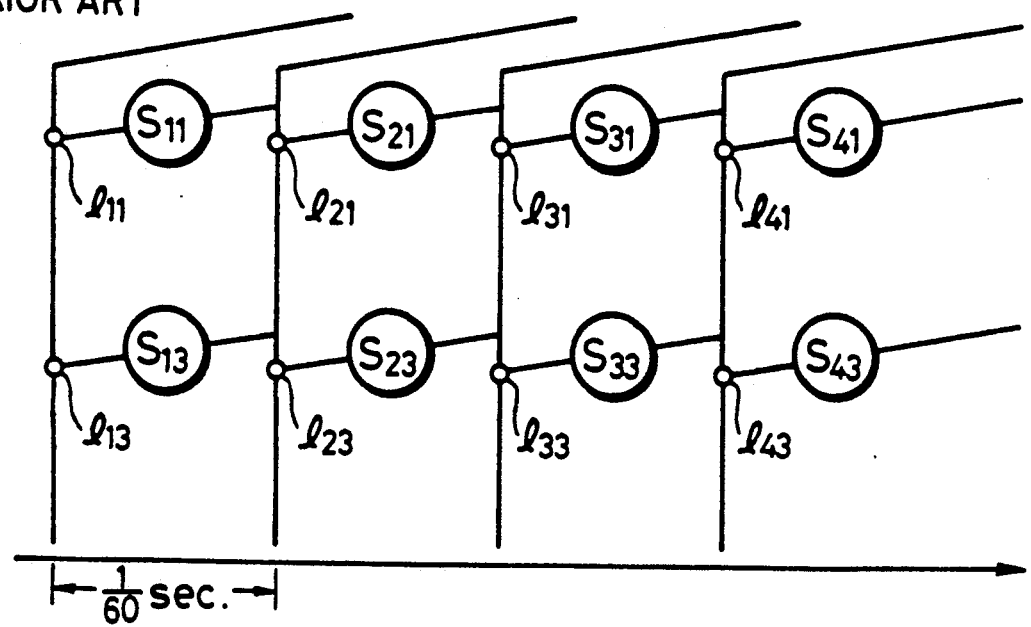
Figure 2A:
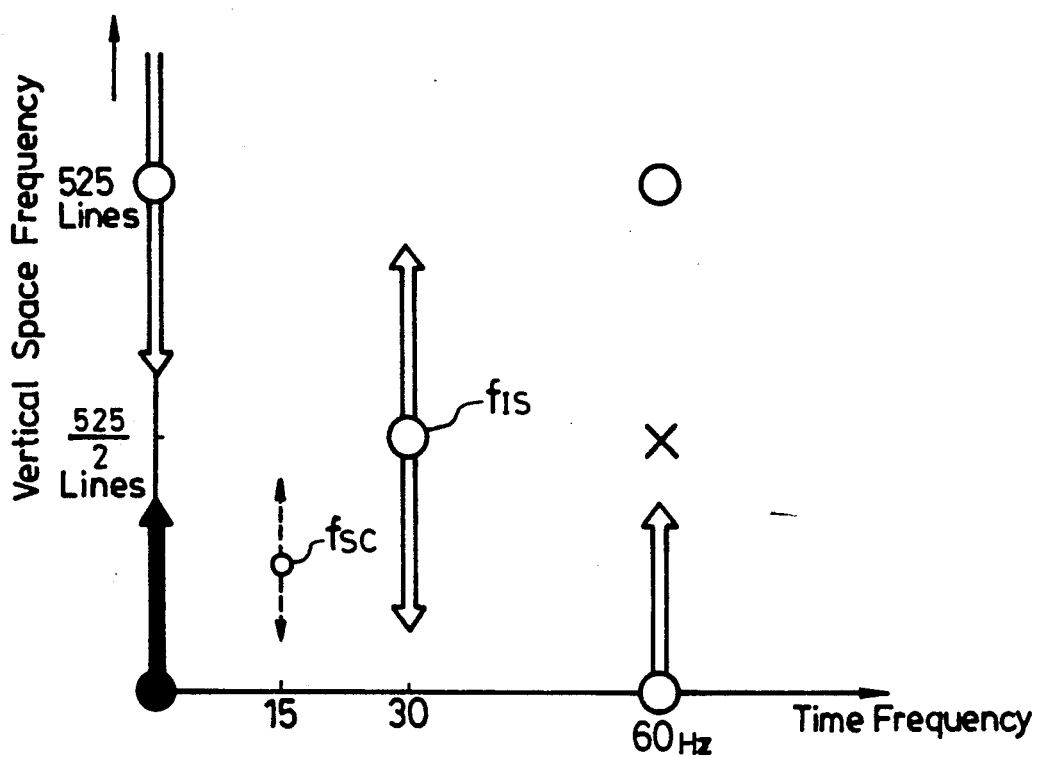
FIGS. 2A and 2B are schematic representations used to explain the present invention, respectively.
Figure 2B:
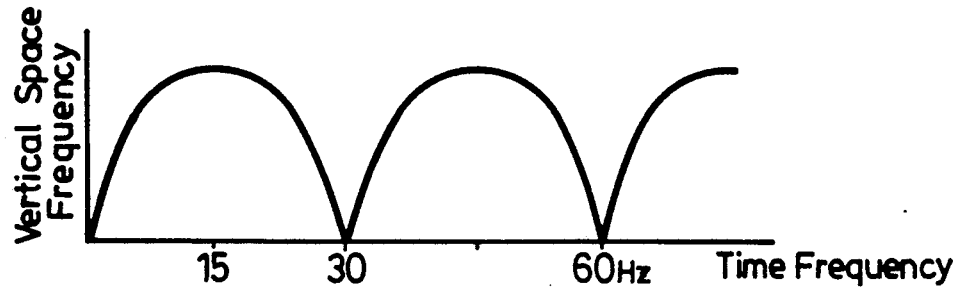
Figure 3A:
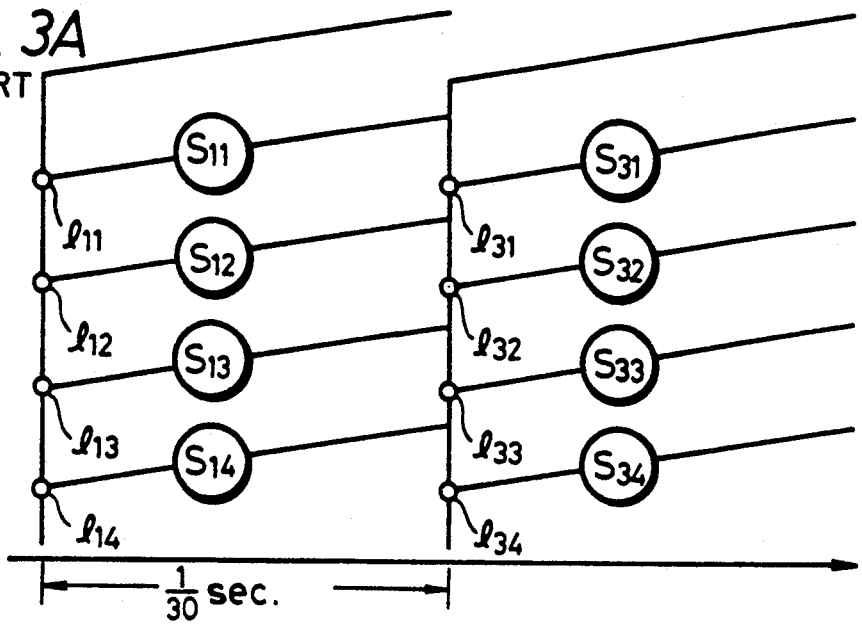
FIGS. 3A, 3B and 3C are schematic representations showing other examples of the arrangement of a conventional television signal, respectively.
Figure 3B:
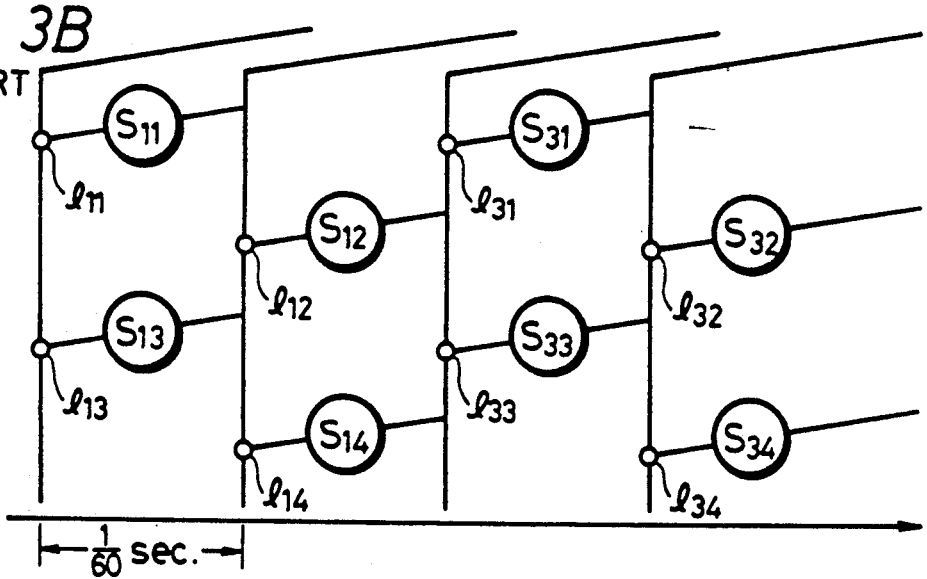
Figure 3C:
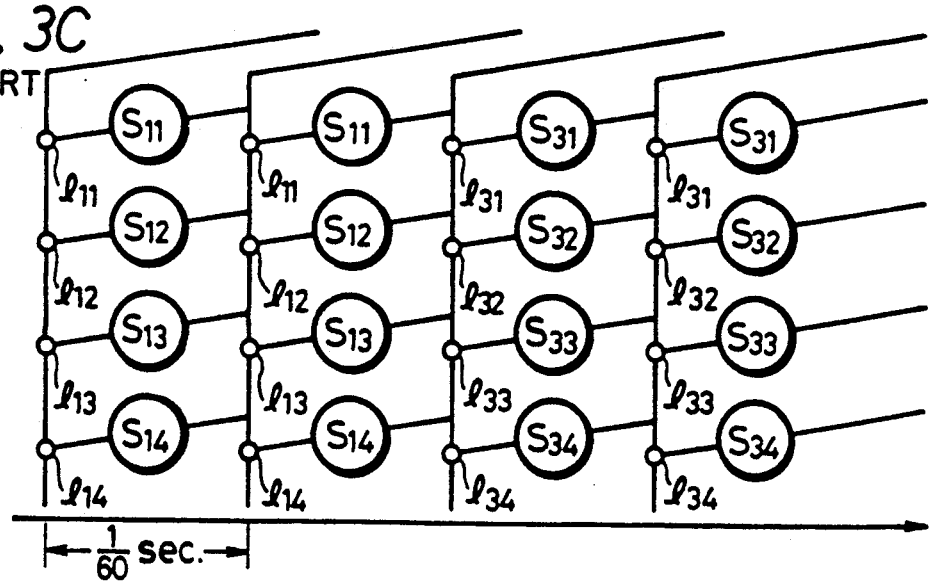
Figure 4A:
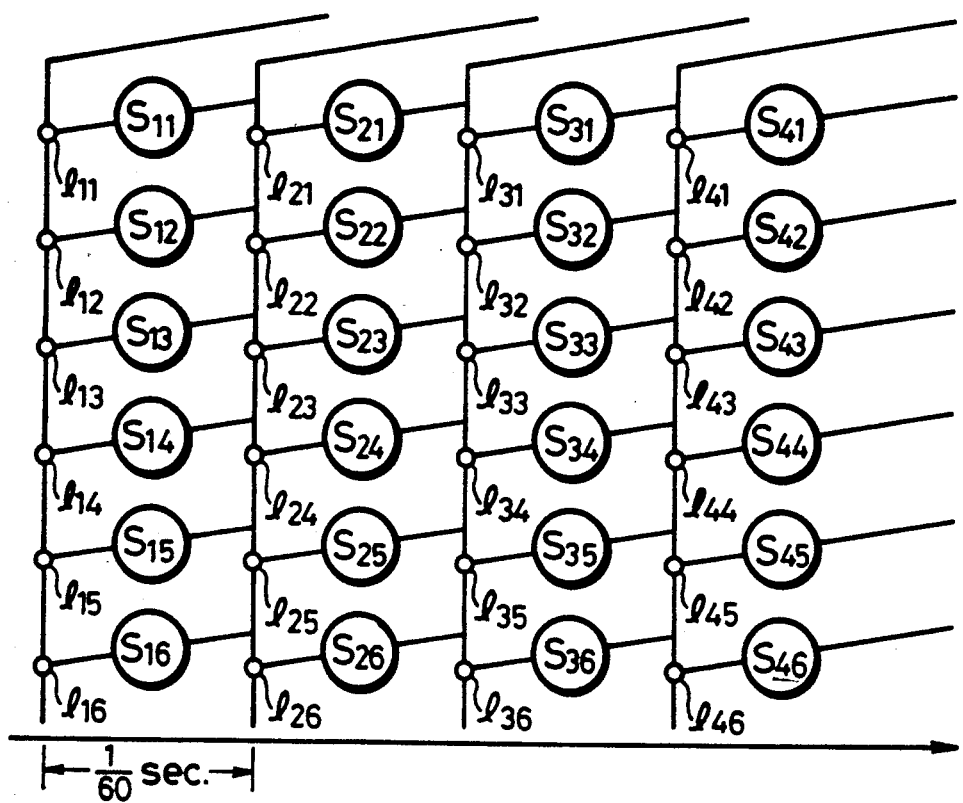
FIGS. 4A and 4B are conceptual diagrams of a television signal used in an embodiment of a television signal processing system according to the present invention.
Figure 4B:
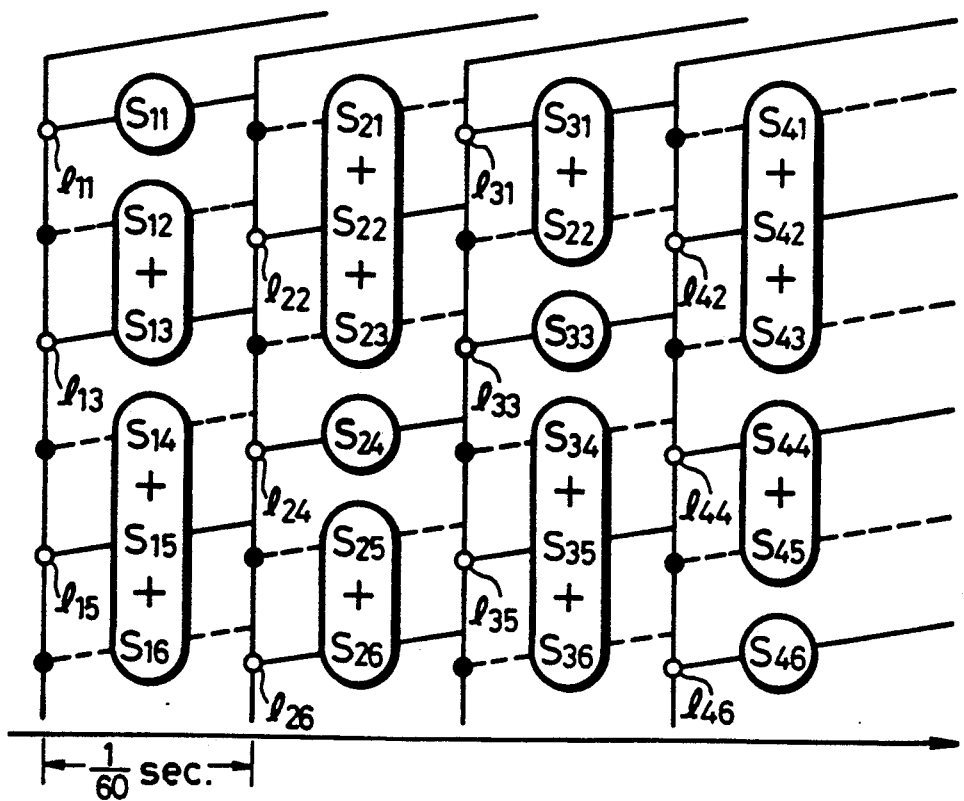

Referring to FIG. 5, there is shown a television camera 1 and this camera 1 is what may be called a sequentially-scanning type television camera. This camera 1 is adapted to pick up an image by scanning 525 lines at every 1/60 second and from which television signals corresponding to respective scanning lines are derived as shown in FIG. 4A. The output from this television camera 1 is supplied to a scan converter circuit 10 located at the transmitting side, in which, as shown in FIG. 4B, it is converted to a television signal of the block scanning system corresponding to the interlaced scanning system so as thereby to become compatible with the existing television signal transmitting system. While this scan conversion will be explained in greater detail later, during the odd field period, the television signal is transmitted at timing corresponding to the odd-numbered scanning lines, while during the even field period, the television signal is transmitted at timing corresponding to the even-numbered scanning lines. In this case, television signals of one block corresponding to a plurality of consecutive scanning lines in the vertical direction, for example, television signals $S_{11}$, $S_{12}$, $S_{13}$ and television signals $S_{21}$, $S_{22}$, $S_{23}$ are divided such that in the first field period they are divided into two groups of the television signal $S_{11}$ and the television signal $S_{12}+S_{13}$ and then transmitted at the timings of different scanning lines $l_{11}$ and $l_{13}$ as shown in FIG. 4B while in the second field period, the television signals $S_{21}$, $S_{22}$ and $S_{23}$ are composed as a single group of a television signal $S_{21}+S_{22}+S_{23}$ and then transmitted at the timing of the single scanning line $l_{22}$.

Further, in the first field period, the television signals $S_{14}$, $S_{15}$ and $S_{16}$ are composed as a single group and then transmitted at the timing of the single scanning line $l_{15}$, whereas in the second field period, a television signal $S_{24}$ and a television signal $S_{25}+S_{26}$ are grouped and then transmitted at the timings of different scanning lines $l_{24}$ and $l_{26}$; respectively.

Similarly as described above, both in the third and fourth field periods, as shown in FIG. 4B, television signals corresponding to three scanning lines are divided into two groups of television signals or composed into a single group and then transmitted. It will be clear from FIG. 4B that the pattern of dividing and composing the television signals is repeated cyclically. This pattern is repeated within each field and also repeated cyclically at every 4 fields.

The output from the scan converter circuit 10 is supplied to an NTSC encoder 2, in which it is converted to a television signal according to the NTSC system. This NTSC television signal from the NTSC encoder 2 is supplied through a broadcasting system 3 to an existing television receiver $RX_N$ and a television receiver $RX_E$ which corresponds to the television signal transmitting system of the present invention.

In the existing television receiver $RX_N$, television signals of three primary colors decoded by an NTSC decoder 4 are supplied to a picture tube 5 and thereby a television signal corresponding to the interlaced scanning system as shown in FIG. 4B is reproduced on the picture screen thereof.

In this case, a sharp reproduced picture corresponding to a single scanning line and a slightly-blurred reproduced picture corresponding to two or three scanning lines alternately appear on the same picture screen in the vertical direction and also in the field direction (time direction). For this reason, similarly to the case of a color sub-carrier, the blur of the reproduced picture is prevented from becoming conspicuous by the integration effect of the sense of sight, and at the same time, the line flicker is decreased.

In the television receiver $RX_E$ corresponding to the television signal transmitting system of the present invention, the television signals of three primary colors decoded by an NTSC decoder 6 are supplied to a scan converter circuit 30, which will be described later, and in which they are converted to sequentially-scanning line signals and then the signals are supplied to a double-scanning picture tube 7. Therefore, the television signals formed by the sequential double-scanning as shown in FIG. 4A are displayed on the picture screen of the picture tube 7.

If the television signal formed by the television signal transmitting system of the present invention is transmitted without being passed through the broadcasting system 3, the NTSC encoder 2 and the NTSC decoders 4 and 6 will be removed. Further, if a television camera is formed of a solid state image pickup device, it is possible to immediately obtain the television signals shown in FIG. 4B by controlling the solid state image pickup device. In this case, the scan converter circuit 10 can be omitted.

Figure 7:
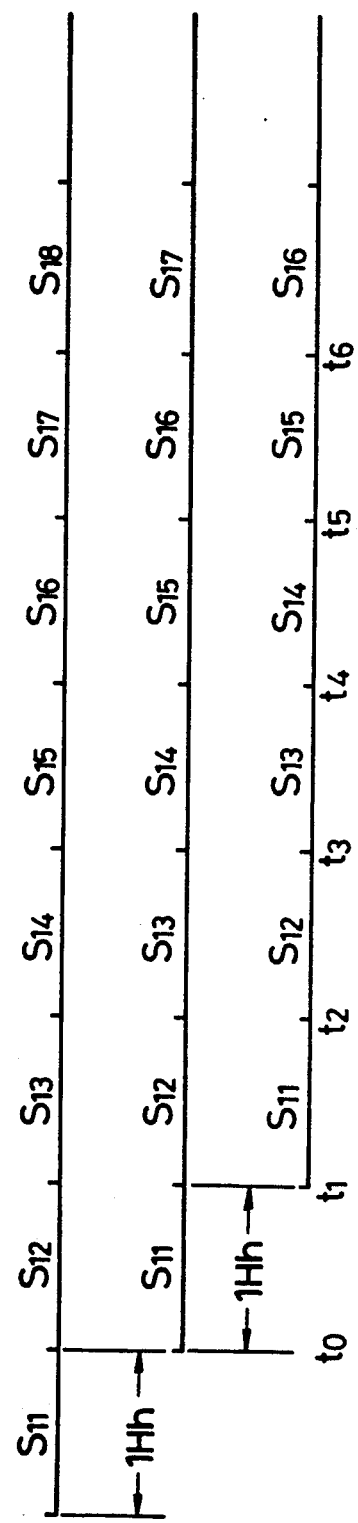
FIGS. 7A to 7E are timing charts used to explain the operation of the main portion shown in FIG. 6, respectively.

The way of how to convert the sequential scanning to the block scanning will be described next with reference to FIGS. 6 and 7.

FIG. 6 illustrates the circuit arrangement of the scan converter circuit 10 (FIG. 5) used in such sequential scanning/block scanning conversion.

As illustrated in FIG. 6, there are shown delay lines 11 and 12 of which the delay times are selected to be one horizontal scanning period Hh ($=H/2$) of the double-scanning system. Both the delay lines 11 and 12 are connected in series to an input terminal IN. The input and output signals of the first delay line 11 are supplied to a first adder 13 while the input and output signals of the second delay line 12 are supplied to a second adder 14. The input signal to the first delay line 11 and the output signal from the second adder 14 are supplied to a third adder 15.

There are shown first and second attenuators 16 and 17 of which attenuation factors are selected to be ⅓ and ½, respectively. The first attenuator 16 adapted to directly receives the output from the third adder 15. The output from the second adder 14 is supplied to a first fixed contact 18a of a change-over switch 18 while the output from the first adder 13 is supplied to a second fixed contact 18b of the change-over switch 18. An output developed at a movable contact 18c of the change-over switch 18 is supplied to the second attenuator 17. The outputs from the first and second attenuators 16 and 17 are supplied to fixed contacts 19d and 19e of a step-switch 19 whereas the output from the first delay line 11 is supplied to a fixed contact 19f of the step-switch 19. An output developed at a movable contact 19c of the step-switch 19 is supplied to a time-base expander circuit 20. Further, the step-switch 19 is provided with non-contact fixed contacts 19n between each two adjacent fixed contacts of the three fixed contacts 19d, 19e and 19f.

A ¼ frequency divider 21 receives a vertical drive pulse VD, and under the control of the output from this frequency divider 21, the movable contact 18c of the switch 18 is connected to the first fixed contact 18a during the first and second field periods as illustrated in FIG. 6 and connected to the second fixed contact 18b during the third and fourth field periods. A control circuit 22 receives the vertical drive pulse VD and a horizontal drive pulse HhD of the double-scanning system. Then, under the control of the output from this control circuit 22, the movable contact 19c of the step-switch 19 is changed in position by one step in response to each horizontal drive pulse HhD and the moving direction of the movable contact 19c is reversed with every field.

Now, the operation of this scan converter circuit 10 shown in FIG. 6 will be described hereinbelow.

During the first field period, television signals Ⓐ, Ⓑ and Ⓒ appear, respectively, at the input side of the delay line 11, a junction P between the delay lines 11 and 12 and the output side of the delay line 12, each having a time difference of one horizontal scanning period 1Hh of the double-scanning line-frequency as shown in FIGS. 7A, 7B and 7C.

Since the switch 18 is connected in the illustrated state in FIG. 6 during the first field period as described hereinabove, the second attenuator 17 receives the output of the second adder 14, or the sum Ⓑ+Ⓒ of the television signals developed at the input and output sides of the second delay line 12. The first attenuator 16 receives the output of the third adder 15, or the sum Ⓐ+Ⓑ+Ⓒ of the television signals respectively developed at the input side of the first delay line 11, the junction P and the output side of the second delay line 12. The step-switch 19 directly receives at its fixed contact 19f the television signal Ⓑ developed at the junction P and also receives at its fixed contacts 19e and 19d the sum signals Ⓑ+Ⓒ and Ⓐ+Ⓑ+Ⓒ, which were adjusted in level by the second and first attenuators 17 and 16, respectively.

Let us now examine the first, third and fifth horizontal scanning periods which start from time points t0, t2 and t4 of the television signal Ⓑ developed at the junction P. Then, there exist television signals $S_{11}$, $S_{13}$ and $S_{15}$ which correspond to the first, third and fifth scanning lines, respectively. While, within the scanning periods starting from the time points t2 and t4 of the signal Ⓒ, there exist television signals $S_{12}$ and $S_{14}$ which correspond to the second and fourth scanning lines. A television signal $S_{16}$ corresponding to the sixth scanning line exists within the horizontal scanning period starting from the time point t4 of the signal Ⓐ.

Accordingly, the step-switch 19 receives at its fixed contact 19f the television signal $S_{11}$ corresponding to the first scanning line during one horizontal scanning period starting from the time point t0 at which the television signal $S_{11}$ corresponding to the first scanning line is supplied to the junction P between the first and second delay lines 11 and 12. Then, the step-switch 19 receives at its fixed contact 19e the television signals $S_{12}$ and $S_{13}$ corresponding to the second and third scanning lines during one horizontal scanning period starting from the time point t2 and also receives at its fixed contact 19d television signals $S_{14}$, $S_{15}$ and $S_{16}$ corresponding to the fourth, fifth and sixth scanning lines during one horizontal scanning period starting from the time point t4.

Since the television signals supplied to the fixed contacts 19d, 19e and 19f of the switch 19 and the timing relationships thereof are made as described hereinabove, the movable contact 19c of the switch 19 is connected to its fixed contact 19f at time point t0. Thereafter, each time the double-scanning horizontal drive pulse HhD is supplied to the control circuit 22, the movable contact 19c of the switch 19 is changed in position by one step in the clockwise direction. Thus, the step-switch 19 generates intermittently the television signals, which are divided or composed similarly as shown in FIG. 4B, at every other horizontal scanning period.

In the timebase expander circuit 20, as shown by a dashed line in FIG. 7E, the television signal supplied thereto is immediately written in a memory (not shown), and read out therefrom during a time period twice that necessary in the writing thereof and thereby converted to an interlaced television signal which is continuous in a time.

A substantially similar signal processing is carried out during the second field period. However, as shown in FIG. 4B, the timing at which television signals corresponding to the respective scanning lines are divided or composed is different from that of the first field period, so that at time point tl (see FIG. 7) when the television signal $S_{21}$ corresponding to the first scanning line arrives at the output side of the delay line 12, the movable contact 19c of the step-switch 19 is connected to its fixed contact 19d which is supplied with the output from the first attenuator 16. Thereafter, the movable contact 19c of the step-switch 19 is moved by one step in the clockwise direction in response to each horizontal drive pulse HhD.

During the third and fourth field periods, the switch 18 is connected to the other position shown in FIG. 6 to permit the sum Ⓐ+Ⓑ of the signals developed at the input and output sides of the first delay line 11 to be supplied to the second attenuator 17.

During the third field period, at time point tl when a television signal $S_{31}$ corresponding to the first scanning line reaches the junction P between the delay lines 11 and 12 (see FIG. 7), the movable contact 19c of the step-switch 19 is connected to its fixed contact 19e which is supplied with the output from the second attenuator 17. Then, the movable contact 19c of the step-switch 19 is moved by one step in the counter-clockwise direction at every horizontal drive pulse HhD.

During the fourth field period, at time point tl when a television signal $S_{41}$ corrresponding to the first scanning line reaches the output side of the delay line 12 (see FIG. 7), the movable contact 19c of the step-switch 19 is connected to the fixed contact 19d which is supplied with the output from the first attenuator 16. Thereafter, the movable contact 19c of the step-switch 19 is moved by one step in the counter-clockwise direction at every horizontal drive pulse HhD.

The connection states of the above-mentioned switches 18 and 19 are expressed on the following table 1.

TABLE 1

| | | Step-switch 19 | | |
| --- | --- | --- | --- | --- |
| Field | Connected state of switch 18 | Initial time point | Connected to | Moving direction |
| 1 | Connected to the fixed contact 18a | t0 | Connected to the contact 19f | clockwise direction |
| 2 | Connected to the fixed contact 18a | t1 | Connected to the contact 19d | clockwise direction |
| 3 | Connected to the fixed | t0 | Connected to the | counter-clockwise |

TABLE 1-continued

| Field | Connected state of switch 18 | Step-switch 19 | | |
|---|---|---|---|---|
| | | Initial time point | Connected to | Moving direction |
| | contact 18b | | contact 19e | direction |
| 4 | Connected to the fixed contact 18b | t1 | Connected to the contact 19d | counter-clockwise direction |

The above mentioned scan converting processing is repeated cyclically at every 4 fields to thereby transmit a block scanning type transmitting signal from an output terminal OUT of the scan converter circuit 10 to the broadcasting system 3. In this case, the phase of the color sub-carrier is reset at the beginning of the (4N+1)th field by the rise of the output from the frequency-divider 21 where N is taken as an integer.

How to convert the block scanning to the sequential scanning will be described next with reference to FIGS. 8 and 9.

Figure 8:
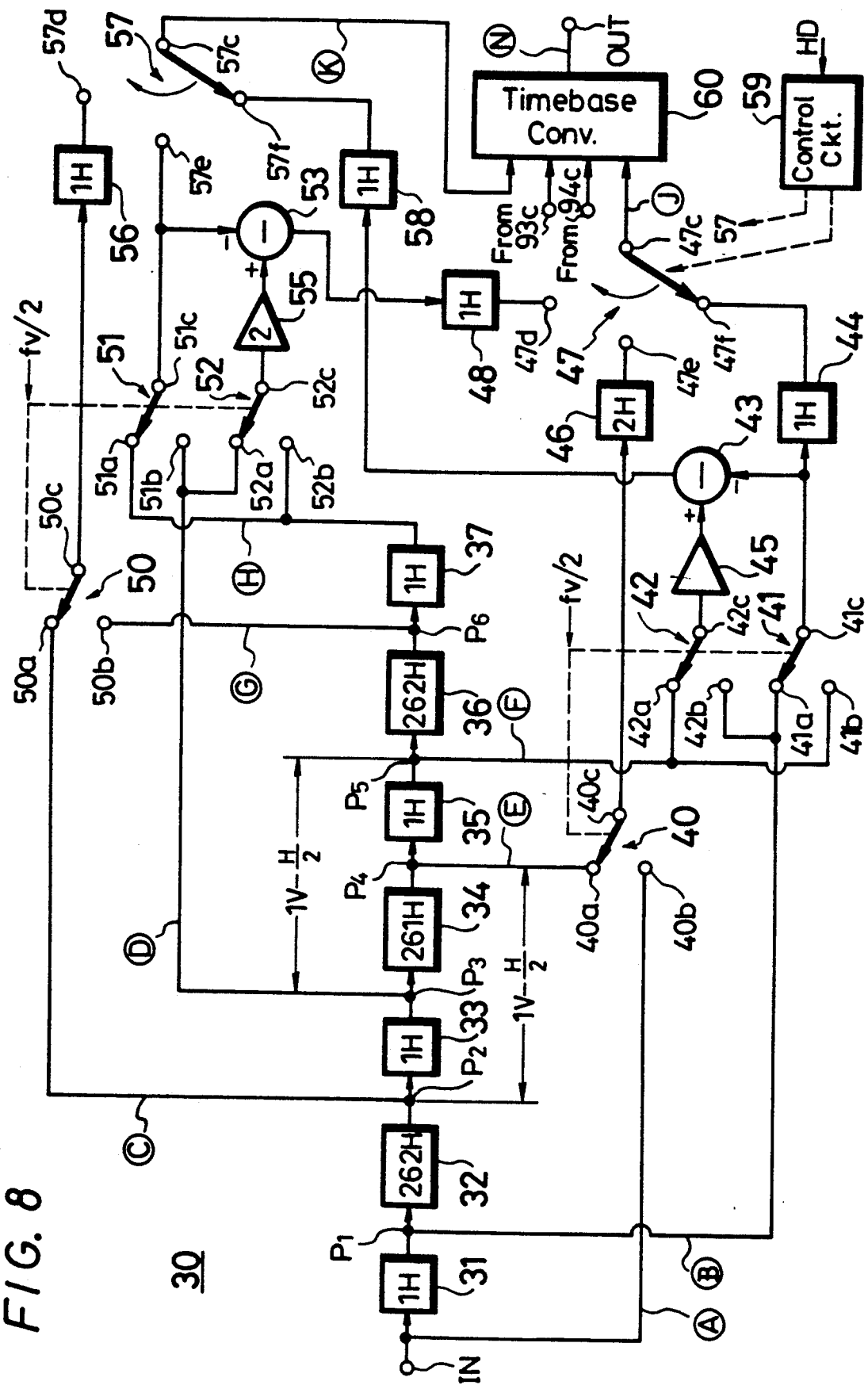
FIG. 8 is a block diagram showing an arrangement of the other main portion of the present invention.
Figure 9:
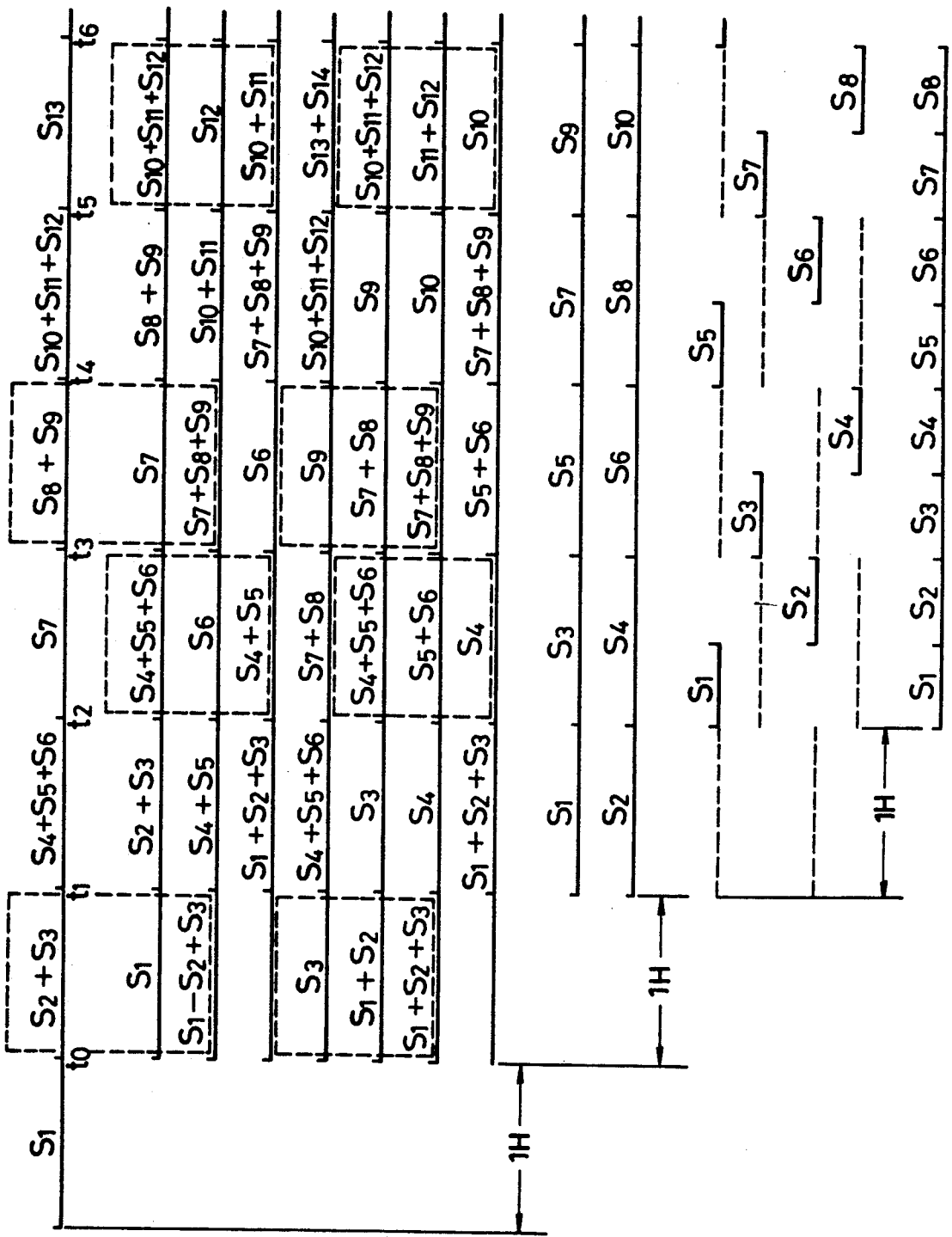
FIGS. 9A to 9N are timing charts used to explain the operation of the other main portion of the embodiment of the present invention shown in FIG. 8, respectively.

FIG. 8 illustrates a circuit arrangement of the scan converting circuit 30 (shown in FIG. 5) for carrying out the block scanning/sequential scanning conversion.

Referring to FIG. 8, there are provided 1H delay lines 31, 33, 35 and 37, 262H delay lines 32 and 36 and a 261H delay line 34, respectively, where H is one horizontal period. The block scanning television signal applied to an input terminal IN is supplied to the 1H delay line 31 of the first stage. In this case, the respective delay lines 31 to 37 are connected in series sequentially. If a junction between the delay lines 31 and 32 is taken as P1 and junctions between the adjacent delay lines of those 32 to 37 are taken respectively as P2, P3, P4, P5 and P6, the delay times between input and output of the 262H delay lines 32 and 36, that is, the delay times between the junctions P1 and P2 and between the junctions P5 and P6 become $(1V - 2^H)$ and the delay times between the junctions P2 and P4 and between the junctions P3 and P5 become $(1V - 2^H)$.

Further, there are provided a set of change-over switches 40, 41 and 42 and another set of change-over switches 50, 51 and 52 which are changed in position in ganged relation at every 2 fields. The one set of switches 40 to 42 are connected to the positions as illustrated in FIG. 8 during the first and second field periods and connected to the positions opposite to those in FIG. 8 during the third and fourth field periods. Whereas, the other set of switches 50 to 52 are connected to the positions as illustrated in the figure during the fourth and first field periods and connected to the positions opposite to those in the figure during the second and third field periods.

One fixed contact 40a of the switch 40 is connected to the junction P4, whereas the other fixed contact 40b thereof is connected to the input terminal IN. One fixed contact 41a of the switch 41 and the other fixed contact 42b of the switch 42 are connected together to the junction P1 whereas one fixed contact 42a of the switch 42 and the other fixed contact 41b of the switch 41 are connected together to the junction P5. The output developed at the movable contact 41c of the switch 41 is supplied commonly to a subtracter 43 and a 1H delay line 44, and the output developed at the movable contact 42c of the switch 42 is supplied through an amplifier 45 to the subtracter 43. The output developed at the movable contact 40c of the switch 40 is supplied through a 2H delay line 46 to a second fixed contact 47e of the switch 47. Then, the output of the 1H delay line 44 is supplied to a third fixed contact 47f of the switch 47.

A first fixed contact 50a of the switch 50 is connected to the junction P2, whereas a second fixed contact 50b of the switch 50 is connected to the junction P6. A first fixed contact 51a of the switch 51 and a second fixed contact 52b of the switch 52 are both connected together to the output side of the 1H delay line 37 whereas a first fixed contact 52a of the switch 52 and a second fixed contact 51b of the switch 51 are connected together to the junction P3. The output appeared at a movable contact 51c of the switch 51 is supplied commonly to a subtracter 53 and a second fixed contact 57e of a switch 57. The output developed at a movable contact 52c of the switch 52 is supplied through an amplifier 55 to the subtracter 53. The output appeared at a movable contact 50c of the switch 50 is supplied through a 1H delay line 56 to a first fixed contact 57d of the switch 57.

The output from the subtracter 53 is supplied through a 1H delay line 48 to a first fixed contact 47d of a switch 47. The output from the subtracter 43 is supplied through a 1H delay line 58 to a third fixed contact 57f of the switch 57. Under the control of a control signal from a control circuit 59, the movable contacts 47c and 57c of the switches 47 and 57 are respectively moved by one step in the clockwise direction at every horizontal drive pulse HD. The outputs developed at the movable contacts 47c and 57c of the switches 47 and 57 are supplied to a timebase converter circuit 60 and the output from the timebase converter circuit 60 is delivered to a output terminal OUT.

The operation of the embodiment shown in FIG. 8 will be described hereinafter.

In the case of a still picture, television signals corresponding to the same scanning lines in the respective field periods have equal content, so that the suffixes added to the respective television signals $S_{11}$ to $S_{46}$ of FIG. 4B and concerning the field periods can be omitted.

Now, let us consider the signals $S_1$ to $S_3$ of the upper one block (odd-numbered block). In the case of the odd field period, two television signals $S_1$ and $S_3$ corresponding to the single scanning line exist independently up to the preceding 2 field periods whereas in the case of the even field period, they exist independently up to the preceding 3 field periods, so that the remaining one television signal $S_2$ can be separated therefrom easily.

In like manner, let us consider the television signals $S_4$ to $S_6$ of the lower one block (even-numbered block). In the case of the odd field period, two television signals $S_4$ and $S_6$ corresponding to the same scanning line exist independently in the range of up to the preceding 3 field periods, whereas in the case of the even field period, they independently exist in the range up to the preceding 2 field periods, so that the remaining one television signal $S_5$ can be separated therefrom easily.

During the first field period, the switches 40 to 42 and 50 to 52 are connected in the illustrated states as earlier described.

When a series of signals Ⓐ shown in FIG. 9A is supplied from the input terminal IN to the scan converting circuit 30, as shown in FIG. 9B, at time point t0 when the television signal $S_1$ corresponding to the first scanning line reaches the junction P1 between the delay lines 31 and 32, the television signal $S_3$ and the television signal $S_1 + S_2$ of the preceding 2 fields before arrive at the junctions P4 and P5 as shown in FIGS. 9E and 9F, respectively.

The television signal $S_1$ developed at the junction P1 is supplied through the switch 41 to the subtracter 43 and is also supplied to the delay line 44, in which it is delayed by the delay time of 1H. The television signal $S_3$ appearing at the junction P4 is supplied through the switch 40 to the delay line 46, in which it is delayed by the delay time of 2H. The television signal $S_1+S_2$ appearing at the Junction P5 is supplied through the switch 42 to the amplifier 45. The amplification factor of this amplifier 45 is selected to be "2" in response to the attenuation factor "$\frac{1}{2}$" of the second attenuator 17 in FIG. 6. The subtracter 43 subtracts the television signal $S_1$ of the switch 41 from the television signal $S_1+S_2$ of the amplifier 45 to separate the television signal $S_2$. This separated signal $S_2$ is supplied to the delay line 58, in which it is delayed by the delay time of 1H.

Accordingly, the television signals $S_1$ and $S_2$ arrive at the third fixed contacts 47f and 57f of the switches 47 and 57 at time point t1 which is delayed from the time point t0 by a delay time of 1H as shown in FIGS. 9J and 9K. At time point t2 delayed from the time point t1 by a delay time of 1H, the television signal $S_3$ arrives at the second fixed contact 47e of the switch 47.

At time point t2, as shown in FIGS. 9C and 9D, the television signals $S_6$ and $S_4+S_5$ of one field before respectively reach the junctions P2 and P3, and the television signal $S_4$ of 3 fields before appears at the output side of the 1H delay line 37 as shown in FIG. 9H.

The signal $S_4$ developed at the output side of the 1H delay line 37 is supplied through the switch 51 to the subtracter 53, and is also supplied to the second fixed contact 57e of the switch 57. The television signal $S_6$ developed at the junction P2 is supplied through the switch 50 to the 1H delay line 56, in which it is delayed by the delay time of 1H. The television signal $S_4+S_5$ appearing at the junction P3 is supplied through the switch 52 to the amplifier 55. The amplification factor of this amplifier 55 is selected to be "2" in response to the attenuation factor "$\frac{1}{2}$" of the second attenuator 17 of FIG. 6. The subtracter 53 subtracts the signal $S_4$ of the switch 51 from the television signal $S_4+S_5$ of the amplifier 55 to thereby separate the television signal $S_5$. This television signal $S_5$ supplied to the 1H delay line 48 and thereby delayed by the delay time of 1H.

As shown in FIGS. 9J and 9K, the television signals $S_5$ and $S_6$ arrive at the first fixed contacts 47d and 57d of the switches 47 and 57 respectively at time point t3 which is delayed from time point t2 by the delay time of 1H. Also, similarly as described above, the television signal $S_4$ reaches the second fixed contact 57e of the switch 57.

As will be clear from FIGS. 9B to 9H, thereafter similar block scanning signals appear at the junctions P1 to P6 and at the output side of the 1H delay line 37 at every 3H periods and similar operations are repeated.

The movable contacts 47c and 57c of both the switches 47 and 57 are respectively connected to the positions illustrated in FIG. 8 at time point t2 and then the movable contacts 47c and 57c are moved by one step in the clockwise direction at every horizontal drive pulse HD. As a result, interlaced scanning television signals $S_1$, $S_3$, $S_5$, . . . corresponding to the odd-numbered scanning lines of the sequential double-scanning system as shown in FIG. 9J are sequentially supplied to the timebase converter circuit 60 from the switch 47. At the same time, interpolated television signals $S_2$, $S_4$, $S_6$, . . . corresponding to the even-numbered scanning lines as shown in FIG. 9K are sequentially supplied to the timebase converter circuit 60 from the switch 57.

In the timebase converting circuit 60, as shown in FIG. 9L, the television signals $S_1$, $S_3$, $S_5$, . . . corresponding to the odd-numbered scanning lines and shown in FIG. 9J are sequentially written in a memory (not shown) and then read out therefrom at a reading period $\frac{1}{2}$ the writing period just after they were written in the memory. As shown in FIG. 9M, the television signals $S_2$, $S_4$, $S_6$, . . . corresponding to the even-numbered scanning lines and shown in FIG. 9K are sequentially written in a memory (not shown) and then read out therefrom at a reading period $\frac{1}{2}$ the writing period with a delay of H/2 immediately after the completion of the writing operation. As described above, the television signals $S_1$, $S_3$, $S_5$, . . . corresponding to the odd-numbered scanning lines and the television signals $S_2$, $S_4$, $S_6$, . . . corresponding to the even-numbered scanning lines, each of which is timebase-compressed, are generated from the timebase converter circuit 60 alternately and thereby sequential double-scanning signals shown in FIG. 9N are reproduced at its output terminal OUT.

During the second field period, one set of the switches 40 to 42 are connected to the positions as illustrated in FIG. 8 while the other set of the switches 50 to 52 are connected to the positions opposite to those shown in the figure as described before. Also, similarly as described before, a relationship between the odd-numbered block and the even-numbered block is exchanged in the odd field period and the even field period.

For this reason, during the second field period, the television signal $S_4$ of the second block is made corresponding to the television signal $S_1$ of the first block of the afore-mentioned first field period and made a reference signal. At the point when this television signal $S_4$ reaches the junction P1, the television signal $S_6$ of 2 fields before reaches the junction P4 and the television signal $S_4+S_5$ of 2 fields before reaches the junction P5. At the time point when a television signal $S_7$ of 1 field before reaches the junction P3, the television signal $S_9$ and the television signal $S_7+S_8$ of 2 fields before reach the junction P6 and the output side of the 1H delay line 37, respectively. Owing to an operation which is the same as that of the afore-mentioned first field period, the television signals $S_4$, $S_6$, $S_8$, . . . corresponding to the even-numbered scanning lines are sequentially generated from the switch 47 and the television signals $S_5$, $S_7$, $S_9$, . . . corresponding to the odd-numbered scanning lines are sequentially generated from the other switch 57.

During the third field period, as described before, one set of the switches 40 to 42 and the other set of the switches 50 to 52 are connected to the positions opposite to those illustrated in FIG. 8. Further, it will be clear from FIG. 4B that the upper and lower relationship between the divided patterns of the signals of the odd-numbered blocks is exchanged during the first and third field periods.

For this reason, during the third field period, the television signal $S_3$ of the first block is employed as a reference signal.

At the time point when this television signal $S_3$ the input terminal IN, the television signal $S_1$ of 2 fields before reaches the junction P5 whereas the television signal $S_1+S_2$ of 1 line before reaches the junction P1.

Further, at the time point when the television signal $S_4$ of 1 field before reaches the junction P3, the television signals $S_6$ and $S_4+S_5$ of 2 fields before respectively reach to the junction P6 and the output side of the 1H delay line 37. Then, due to an operation which is the same as that of the case of the first field period, the television signals $S_1$, $S_3$, $S_5$ . . . corresponding to the odd-numbered scanning lines are sequentially delivered from the switch 47 while the television signals $S_2$, $S_4$, $S_6$, . . . corresponding to the even-numbered scanning lines are sequentially delivered from the other switch 57.

During the fourth field period, one set of the switches 40 to 42 are connected in the illustrated states similarly to the first field period, whereas the other set of the switches 50 to 52 are connected in the states opposite to the states shown in FIG. 8, similarly to the third field period. Also, as earlier noted, the relationship between the odd-numbered block and the even-numbered block is exchanged in the odd field period and the even field period.

For this reason, during the fourth field period, the television signal $S_6$ of the second block is made a reference signal.

At the time point when the television signal $S_6$ reaches to the input terminal IN, the television signal $S_4$ of 2 fields before reaches the junction P5 and the television signal $S_4+S_5$ of one line before reaches the junction P1. At the time point in which the television signal $S_9$ of one field before reaches the junction P2, the television signals $S_8+S_9$ and $S_7$ of 2 fields before respectively reach the junction P6 and the output side of the 1H delay line 37. Then, due to an operation which is similar to that of the first field period, the television signals $S_4$, $S_6$, $S_8$, . . . corresponding to the even-numbered scanning lines are sequentially derived from the switch 47 and the television signals $S_5$, $S_7$, $S_9$, . . . corresponding to the odd-numbered scanning lines are derived sequentially from the other switch 57.

After the fifth field period, the block scanning television signal is converted to a sequential scanning television signal at every 4 fields.

The connected states of the above-mentioned switches 40 and 50 are illustrated in the following table 2.

TABLE 2

| Field | Connected state of switch 40 | Connected state of switch 50 |
| --- | --- | --- |
| 1 | Connected to the fixed contact 40a | Connected to the fixed contact 50a |
| 2 | Connected to the fixed contact 40a | Connected to the fixed contact 50b |
| 3 | Connected to the fixed contact 40b | Connected to the fixed contact 50b |
| 4 | Connected to the fixed contact 40b | Connected to the fixed contact 50a |

As will be clear from FIG. 4B, the block scanning television signal is transmitted in the odd field period during the odd-numbered scanning line period, whereas it is transmitted in the even field period during the even-numbered scanning line period. Accordingly, during the first to fourth field periods, the signal delivered from the switch 47 is an interlaced-scanning signal $S_{IS}$ corresponding to the transmission scanning line period, whereas the signal delivered from the other switch 57 is an interpolated signal $S_{IP}$ which does not correspond to the transmission scanning line period.

According to this embodiment, since the signal processing is carried out as described above, the original picture information composed and transmitted by the block scanning can be correctly separated and then reproduced so that the picture quality of the reproduced picture can be prevented from being deteriorated.

While the respective television signals are separated from the signals divided into two groups of television signals such as the television signal $S_1$ and the television signal $S_1+S_2$ as described above, it is possible to separate the respective television signals by using the television signals composed into one group as the television signal $S_1+S_2+S_3$.

Subsequently, the detection of a real moving picture by this emodiment will be described with reference to FIG. 10.

Figure 10:
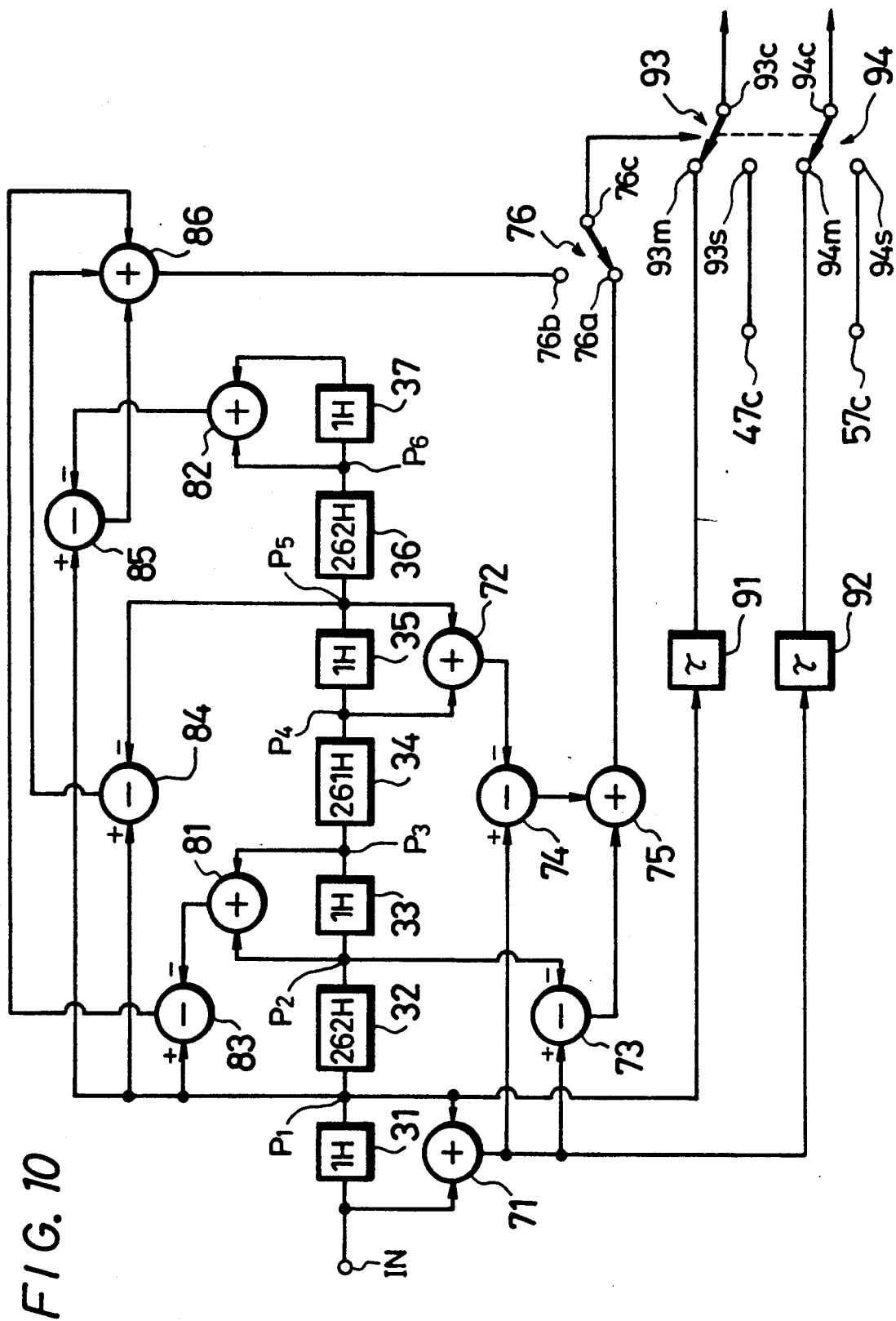
FIG. 10 is a block diagram showing an arrangement of a further main portion of the embodiment of the present invention.

FIG. 10 illustrates a circuit arrangement of the real moving picture detecting circuit used in the embodiment of the present invention. In FIG. 10, like parts corresponding to those of FIG. 8 are marked with the same references and therefore need not be described in detail.

Referring to FIG. 10, the inputs and outputs of the 1H delay lines 31 and 35 are respectively supplied to adders 71 and 72. The output from the adder 71 is supplied commonly to the subtracters 73 and 74. The output appeared at the junction P2 is supplied to the subtracter 73 while the output from the adder 72 is supplied to the subtracter 74. The outputs from both the subtracters 73 and 74 are supplied to an adder 75 and the output from the adder 75 is supplied to a first fixed contact 76a of a switch 76.

The inputs and outputs of the 1H delay lines 33 and 37 are respectively supplied to the adders 81 and 82. The output appearing at the junction P1 is supplied commonly to subtracters 83, 84 and 85, the outputs from the adders 81 and 82 are respectively supplied to the subtracters 83 and 85, and the output appearing at the junction P3 is supplied to the adder 81. The outputs from the subtracters 83 to 85 are supplied to an adder 86, whereas the output from the adder 86 is supplied to a second fixed contact 76b of the switch 76.

The output appearing at the junction P1 and the output derived from the adder 71 are respectively supplied through delay circuits 91 and 92 used for phase adjustment to the real moving picture side fixed contacts 93m and 94m of switches 93 and 94. Still picture side fixed contacts 93s and 94s of the switches 93 and 94 are respectively connected to the movable contacts 47c and 57c of the step-switches 47 and 57 of FIG. 8. Respective movable contacts 93c and 94c of the switches 93 and 94 are switched in ganged relation to each other under the control of the output developed at a movable contact 76c of the switch 76.

The operation of the real moving picture detecting circuit shown in FIG. 10 will now be described hereinbelow.

At the time point when the first transmission signal $S_1$ of the first field exists at the junction P1, the succeeding transmission signal $S_2+S_3$ exists at the input terminal IN. At the same time, the first and second transmission signals $S_1+S_2$ and $S_3$ of the previous 2 fields before exist respectively at the junctions P4 and P5 and the first transmission signal $S_1+S_2+S_3$ of the previous field exists at the junction P2.

Accordingly, the outputs from both the adders 71 and 72 become $S_1+S_2+S_3$ so that the subtracter 73 generates a field difference output and that the subtracter 74 generates a frame difference output. The field difference output and the frame difference output are added by the adder 75. As a result, when the output from the adder 75 is "1" (high level), a picture is judged to be a real moving picture (live picture), while when it is "0" (low level), the picture is judged to be a still picture.

At the time point when the third transmission signal $S_4+S_5+S_6$ of the first field period exists at the junction P1, the second and third transmission signals $S_4+S_5$ and $S_6$ of the previous field exist respectively at the junctions P2 and P3 and a third transmission signal $S_4+S_5+S_6$ of the previous 2 fields before exists at the junction P5. At the same time, second and third transmission signals $S_4$ and $S_5+S_6$ of the prior 3 fields exist at the junction P6 and the output side of the 1H delay line 37, respectively.

Accordingly, the outputs from both the adders 81 and 82 become $S_4+S_5+S_6$ with the result that the subtracter 83 generates the field difference output and that the subtracter 84 generates the frame difference output. Further, the subtracter 85 generates a 3-field difference output. This field difference output and the frame difference output are added by the adder 86. Thus, when the output from the adder 86 is "1", a picture is judged as a real moving picture, while when it is "0", the picture is judged as a still picture.

A real moving picture is detected by the adders and subtracters 81 to 86 when three signals are to be transmitted as one block during one horizontal scanning period, in other words, a signal $S_i+S_j+S_k$ corresponding to (3N)th scanning lines of the interlaced scanning exists at the junction P1. For this reason, the switch 76 is connected to the position opposite to that shown in FIG. 10 at (3N)th scanning line and connected to the position illustrated in the figure at (3N+1)th and (3N+2)th scanning lines.

In the case of a real moving picture, the switches 93 and 94 are respectively connected to the positions illustrated in FIG. 10 and a signal corresponding to the immediately preceding scanning line is interpolated by the adder 71 and then the interpolated signal is delivered through the switch 94.

According to this embodiment, as described above, the field difference output can be obtained by using the signal of one block and the real moving picture can be detected accurately.

Figure 11A:
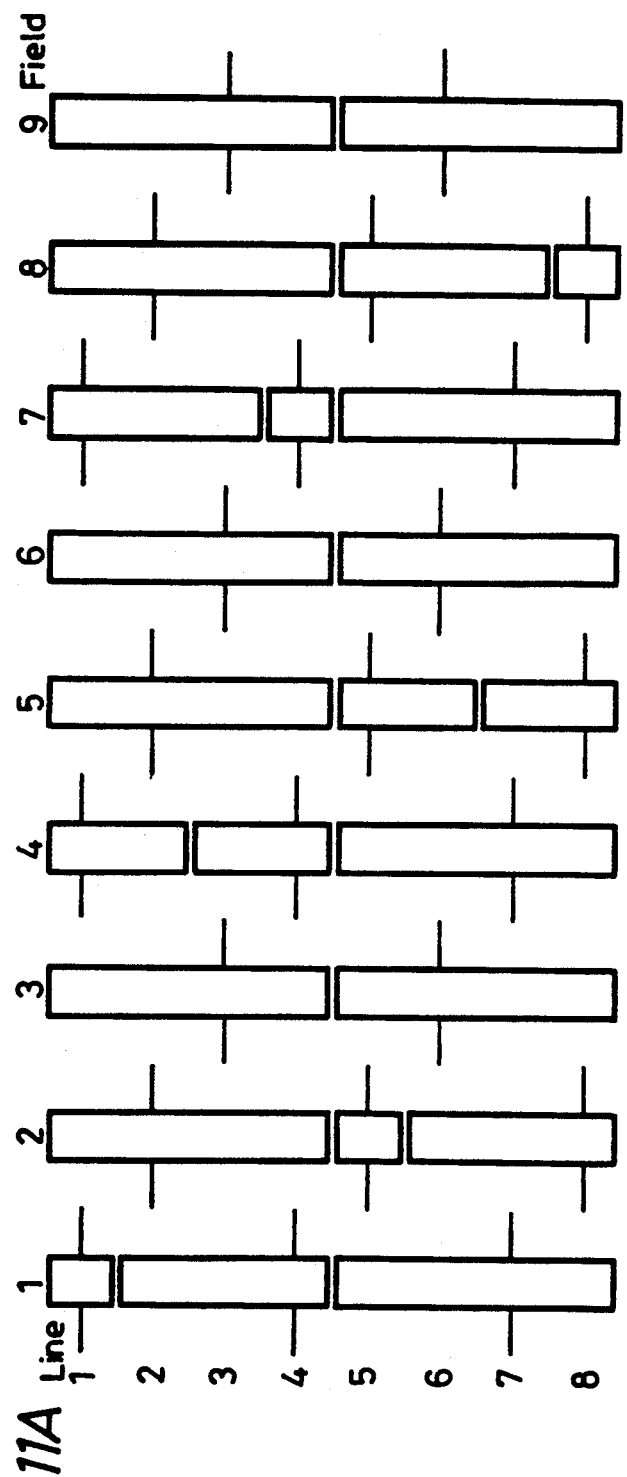
FIGS. 11A and 11B are conceptual diagrams illustrating a television signal used in another embodiment of the television signal processing system according to the present invention, respectively.
Figure 11B:
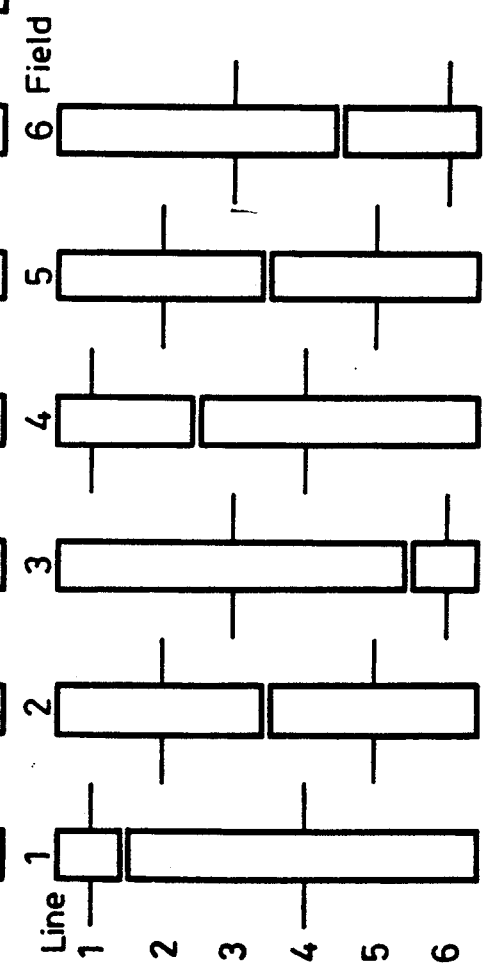

While the television signals corresponding to three scanning lines of the sequential double-scanning system are formed into one block and the pattern of the dividing or composing is repeated cyclically at every 4 field periods, as shown in FIG. 11A, television signals corresponding to four scanning lines may be formed into one block and the pattern of the dividing or composing may be repeated cyclically at every 9 field periods. Alternatively, as shown in FIG. 11B, television signals corresponding to 6 scanning lines may be formed into one block and the pattern of the dividing or composing may be repeated cyclically at every 6 field periods. The block scannings shown in FIG. 11 are all corresponding to the 3:1 interlaced scanning system and the transmission band width thereof can be compressed to ⅓.

Figure 12:
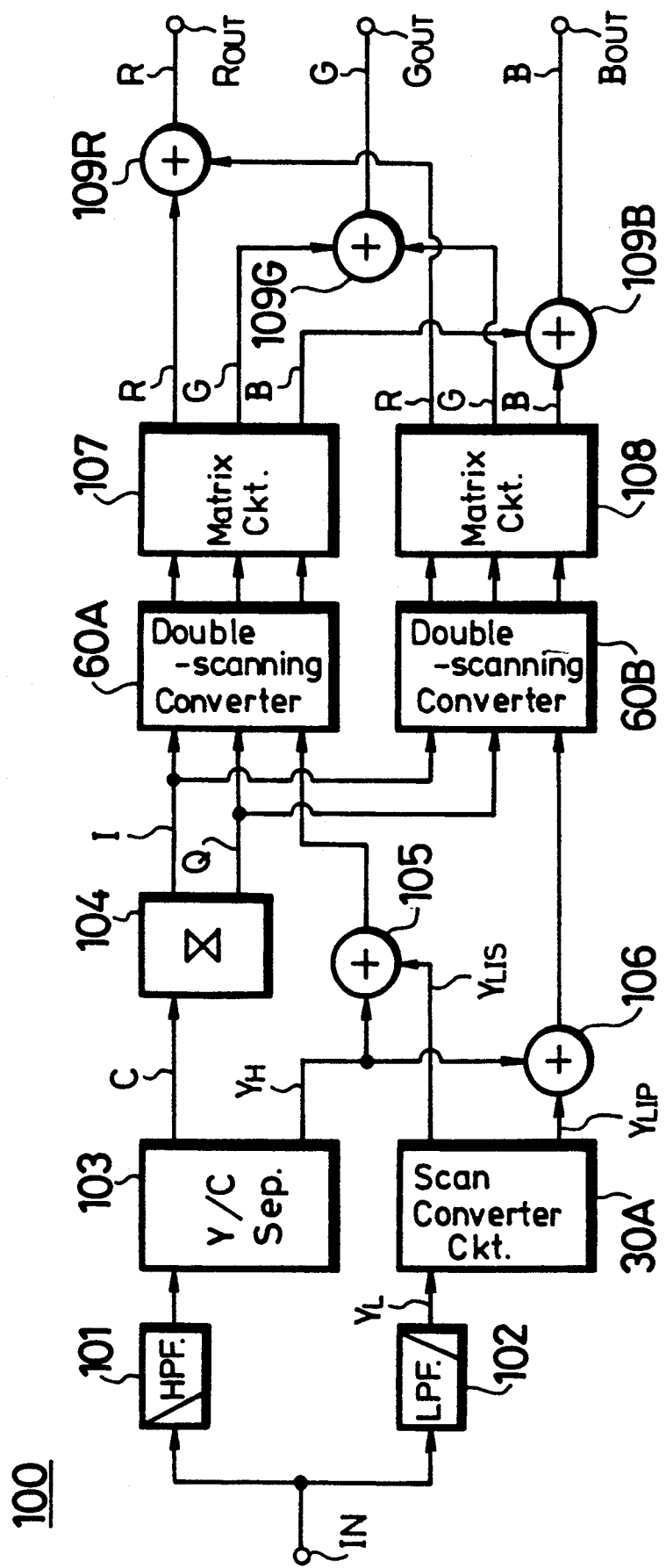
FIG. 12 is a block diagram showing another embodiment of the television signal processing system according to the present invention.

While the scanning conversion by the television signal transmitting system of the present invention is carried out over the whole transmission band in both the transmitting side and the receiving side as described hereinabove, as shown in FIG. 12, the block scanning/sequential scanning conversion may be carried out only for a luminance signal Y of low frequency at the receiving side. Thus, the vertical resolution of the luminance signal Y of low frequency can be improved and the edge of the picture long in the lateral direction can be reproduced with sharpness, thus achieving a remarkable visual effect.

The arrangement of other block scanning/sequential scanning embodiment of the present invention shown in FIG. 12 will be described.

Referring to FIG. 12, there is shown a television receiver 100 which conforms to the television signal transmitting system of the present invention. A block scanning type luminance signal Y and a carrier chrominance signal C generated from the NTSC encoder 2 (FIG. 5) are both supplied through an input terminal IN to a high pass filter 101 and a low pass filter 102 of the television receiver 100, in which they are separated into a carrier chrominance signal C and a high frequency luminance signal $Y_H$ in a frequency band ranging from 2.1 to 4.2 MHz and a low frequency luminance signal $Y_L$ in a frequency band lower than 2.1 MHz.

The carrier chrominance signal C separated by a Y/C separator circuit 103 is supplied through a phase adjusting circuit (not shown) to a color demodulator 104. The high frequency luminance signal $Y_H$ from the Y/C separator circuit 103 is commonly supplied through a phase adjusting circuit (not shown) to adders 105 and 106.

A scan converter circuit 30A is arranged in such a manner that from the scan converter circuit 30 shown in FIG. 8 the timebase converter circuit 60 is separated. In this scan converter circuit 30A, the block scanning type luminance signal $Y_L$ in the low frequency band is converted into an interlaced scanning type luminance signal $Y_{LIS}$ in the low frequency band and an interpolation luminance signal $Y_{LIP}$ in the low frequency band. The luminance signal $Y_{LIS}$ in the low frequency band is added with the luminance signal $Y_H$ of high frequency band by the adder 105 and then fed to a first double-scanning converter circuit 60A, whereas the interpolation luminance signal $Y_{LIP}$ of the low frequency band is added to the luminance signal $Y_H$ of the high frequency band by the adder 106 and then fed to a second double-scanning converter circuit 60B. Color signals I and Q from the color demodulator circuit 104 are commonly supplied to both the double-scanning converter circuits 60A and 60B.

In both of the double-scanning converting circuits 60A and 60B, the respective signals of the high frequency luminance signal $Y_H$ and the color signals I and Q are interpolated by the signals corresponding to the immediately-preceding scanning lines within the respective fields.

The outputs from both the first and second double-scanning converter circuits 60A and 60B are respectively converted into three primary color signals R, G and B by matrix circuits 107 and 108 and the signals of the same color from the matrix circuits 107 and 108 are respectively added by adders 109R, 109G and 109B and then fed to output terminals $R_{OUT}$, $G_{OUT}$ and $B_{OUT}$, respectively.

According to the present invention, as set forth above in detail, since the television signals corresponding to a plurality of successive scanning lines in the vertical direction are formed into a single or a plurality of blocks and then transmitted alternately at every field, while the compatibility with the existing standard television signal transmitting system is maintained by the television signal transmitting system of the present invention, the field difference output can be obtained only by the television signals of one block and the real moving picture can be detected accurately. Thus, the block scanning can be properly converted into the sequential double-scanning without deteriorating the picture quality, and the vertical resolution of the reproduced picture can be improved.

A further embodiment of the present invention will be described hereinafter.

Figure 13:
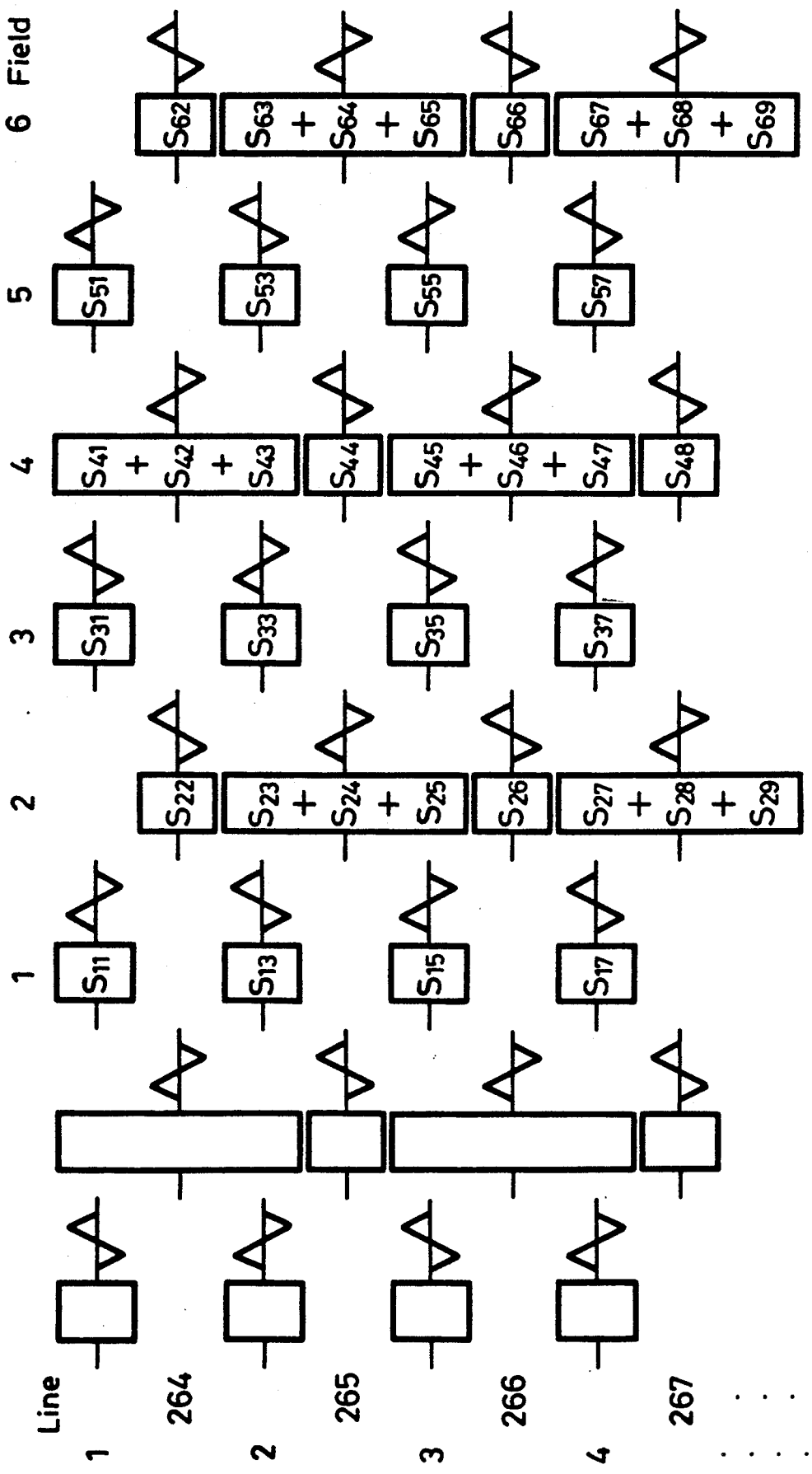
FIG. 13 is a conceptual diagram of a television signal used in a further embodiment of the present invention.

In this embodiment, an overall arrangement of the present invention is formed the same as that already described in relation to FIG. 5. Turning back to FIG. 5, the sequential-scanning type television camera 1 is adapted to produce television signals corresponding to 525 scanning lines at every 1/60 second as shown in FIG. 4A. The output from this television camera 1 is supplied to the scan converter circuit 10 located at the transmitting side, in which it is converted to a television signal of block scanning type corresponding to the interlaced scanning so as to become compatible with the existing television signal transmitting system as shown in FIG. 13. Though this scanning conversion will be described more fully later, as illustrated in FIG. 13, only the television signals of the odd-numbered scanning lines are transmitted at the timing of the odd-numbered scanning lines of the sequential double-scanning during the odd field period, while during the even field period, the television signals are transmitted at the timing of the even-numbered scanning lines of the sequential double-scanning. However, during the second field period, television signals $S_{22}$, $S_{26}$, . . . of only the even-numbered scanning lines and one block of television signal $S_{23}$, $S_{24}$, $S_{25}$; another one block of television signals $S_{27}$, $S_{28}$, $S_{29}$ . . . corresponding to a plurality of scanning lines continuous in the vertical direction and being across the even-numbered scanning lines are alternately transmitted at the timings of the even-numbered scanning lines.

During the fourth field, one block of television signals $S_{41}$, $S_{42}$, $S_{43}$; another one block of television signal $S_{45}$, $S_{46}$, $S_{47}$, and television signals $S_{44}$ and $S_{48}$, each corresponding to only a single scanning line . . . are alternately transmitted with phases opposite to those of the second field period at the timings of the even-numbered scanning lines.

Further, the television signal of only the single scanning line in the second field period, for example, the television signal $S_{22}$ constructs a signal block together with the television signals of the upper and lower scanning lines of the immediately-preceding or immediately-succeeding odd field periods, for example, the television signals $S_{11}$, $S_{13}$ or $S_{31}$, $S_{33}$. In like manner, the television signal of only the single scanning line in the fourth field, for example, the television signal $S_{44}$ forms a signal block together with the television signals of the upper and lower scanning lines in the immediately-preceding or immediately-succeeding odd field periods, for example, the television signals $S_{33}$, $S_{35}$ or $S_{53}$, $S_{55}$.

The above pattern is repeated within each field and also repeated cyclically at every 4 fields.

The phase of the color sub-carrier signal is inverted at every scanning line in the same field picture and at every frame in the same scanning line by a frequency-interleave operation similarly to the existing television signal transmitting system.

Similarly to the television signal transmitting system shown in FIG. 5, the output from the scan converter circuit 10 is supplied to the NTSC encoder 2, in which it is converted to a television signal according to the NTSC system. This NTSC television signal is then supplied through the broadcasting system 3 to the existing television receiver $RX_N$ and the television receiver $RX_E$ conforming to the television transmitting system of the present invention.

In the existing television receiver $RX_N$, three primary color television signals decoded by the NTSC decoder 4 are supplied to the picture tube 5, whereby television signals corresponding to the interlaced scanning as shown in FIG. 13 are reproduced on the picture screen thereof.

In the television receiver $RX_E$ conforming to the television signal transmitting system of the present invention, three primary color television signals are decoded by the NTSC decoder 6 and supplied to a scan converter circuit 30, which will be described in greater detail later, and thereby sequentially-scanned. Then, they are supplied to the double-scanning type picture tube 7, whereby a double-scanning sequential television signal shown in FIG. 4A is displayed on the picture screen thereof.

How to convert the sequential-scanning to the block scanning will be described hereinbelow with reference to FIGS. 14 to 16.

Figure 14:
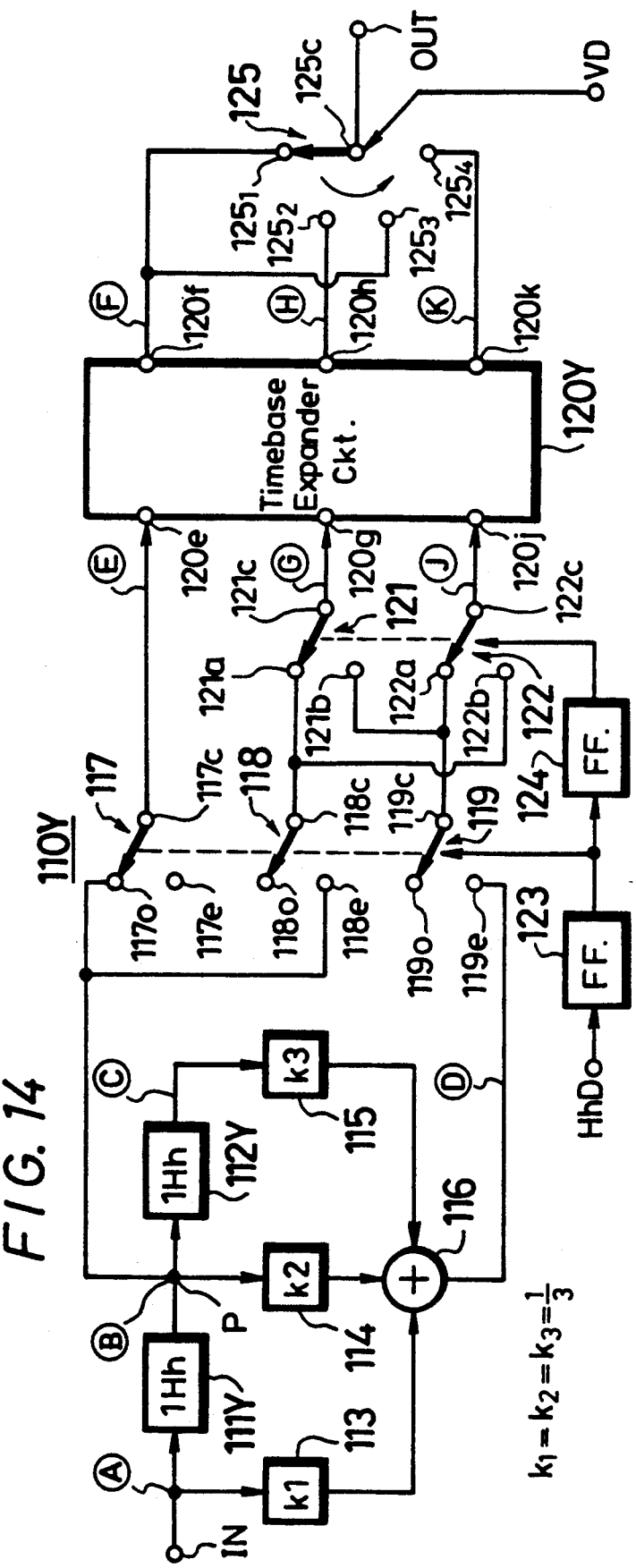
FIG. 14 is a block diagram showing a main portion of the further embodiment of the television signal processing system according to the present invention.

FIG. 14 illustrates an arrangement of a scan converter circuit 110Y used for sequential scanning/block scanning conversion of the luminance signal.

Referring to FIG. 14, there are shown first and second delay lines 111Y and 112Y of which the delay times are selected to be one horizontal scanning period Hh (=H/2) of the double-scanning. Both the first and second delay lines 111Y and 112Y are connected to each other in series and then connected to the input terminal IN.

There are shown first, second and third attenuators 113, 114 and 115 and respective attenuation factors k1, k2 and k3 thereof are selected in order that the sum of their attenuation factors k1, k2 and k3 becomes "1", for example, each of them is selected ⅓. The input to the first delay line 111Y and the input and output of the second delay line 112Y are respectively supplied through the first, second and third attenuators 113, 114 and 115 to an adder 116. The output from the first delay line 111Y is commonly supplied to one fixed contact 117o of a first change-over switch 117 and to a second fixed contact 118e of a second change-over switch 118. The output from the adder 116 is supplied to a second fixed contact 119e of a third change-over switch 119. A timebase expander circuit 120Y is supplied at its input terminal 120e the output appeared at a movable contact 117c of the first change-over switch 117. A movable contact 118c of the second change-over switch 118 is commonly connected to a first fixed contact 121a of a fourth change-over switch 121 and a second fixed contact 122b of a fifth change-over switch 122. A movable contact 119c of the third change-over switch 119 is commonly connected to a second fixed contact 121b of the fourth change-over switch 121 and a first fixed contact 122a of the fifth change-over switch 122. The outputs appearing at the movable contacts 121c and 122c of the fourth and fifth change-over switches 121 and 122 are respectively supplied to input terminals 120g and 120j of the timebase expander circuit 120Y.

A double-scanning horizontal drive pulse HhD is supplied to a first flip flop circuit 123, and under the control of the output from the first flip-flop circuit 123, the respective movable contacts 117c to 119c of the first to third change-over switches 117 to 119 are switched in ganged relation at every horizontal drive pulse HhD such that the movable contacts 117c to 119c are respectively connected to the first fixed contacts 117o to 119o of the first to third change-over switches 117 to 119 at the odd-numbered lines of the double-scanning while they are respectively connected to the second fixed contacts 117e to 119e thereof at the even-numbered line of the double-scanning. The output from the first flip-flop circuit 123 is supplied to a second flip-flop circuit 124. Under the control of the output from the second flip-flop circuit 124, the fourth and fifth change-over switches 121 and 122 are switched in ganged relation such that their movable contacts 121c to 122c are respectively connected to their first fixed contacts 121a and 122a at the first and second lines of the double-scanning while they are respectively connected to their second fixed contacts 121b and 122b at the third and fourth lines of the double-scanning at every two horizontal drive pulses HhD. The connected states of the above-mentioned switches 117 and 121 are expressed in the following table 3.

TABLE 3

| Double-scanning line | Connected state of switch 117 | Connected state of switch 121 |
|---|---|---|
| 1 | Connected to the fixed contact 117o | Connected to the fixed contact 121a |
| 2 | Connected to the fixed contact 117e | Connected to the fixed contact 121a |
| 3 | Connected to the fixed contact 117o | Connected to the fixed contact 121b |
| 4 | Connected to the fixed contact 117e | Connected to the fixed contact 121b |

Turning back to FIG. 14, the output developed at an output terminal 120f of the timebase expander circuit 120Y is supplied to the first and third fixed contacts $125_1$ and $125_3$ of a step-switch 125. At the same time, the outputs developed at the output terminals 120h and 120k of the timebase expander circuit 120Y are supplied respectively to second and fourth fixed contacts $125_2$ and $125_4$ of the step-switch 125 whereas the output appearing at a movable contact 125c of the step switch 125 is delivered to an output terminal OUT.

Under the control of the vertical drive pulse VD, the movable contact 125c of the step-switch 125 is connected to the first fixed contact $125_1$ during the first field period and is connected in turn to the second to fourth fixed contacts $125_2$ to $125_4$ during the second to fourth field periods.

Figure 15:
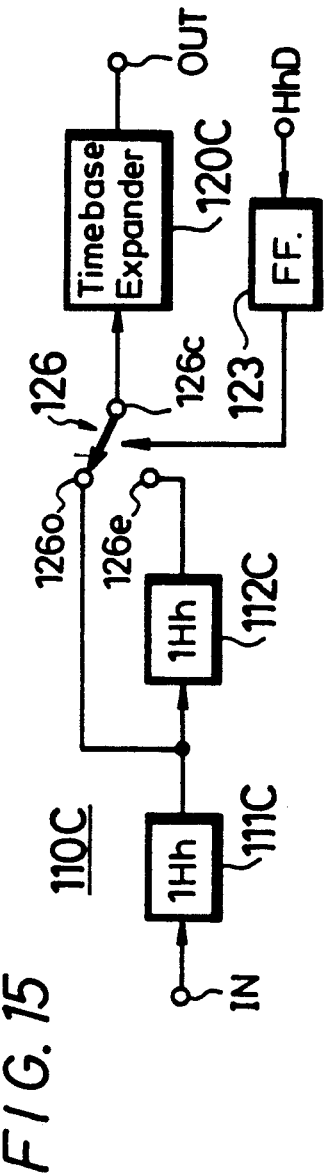
FIG. 15 is a block diagram showing a main portion of a scan converter circuit used in the further embodiment of the present invention shown in FIG. 14.
Figure 16:
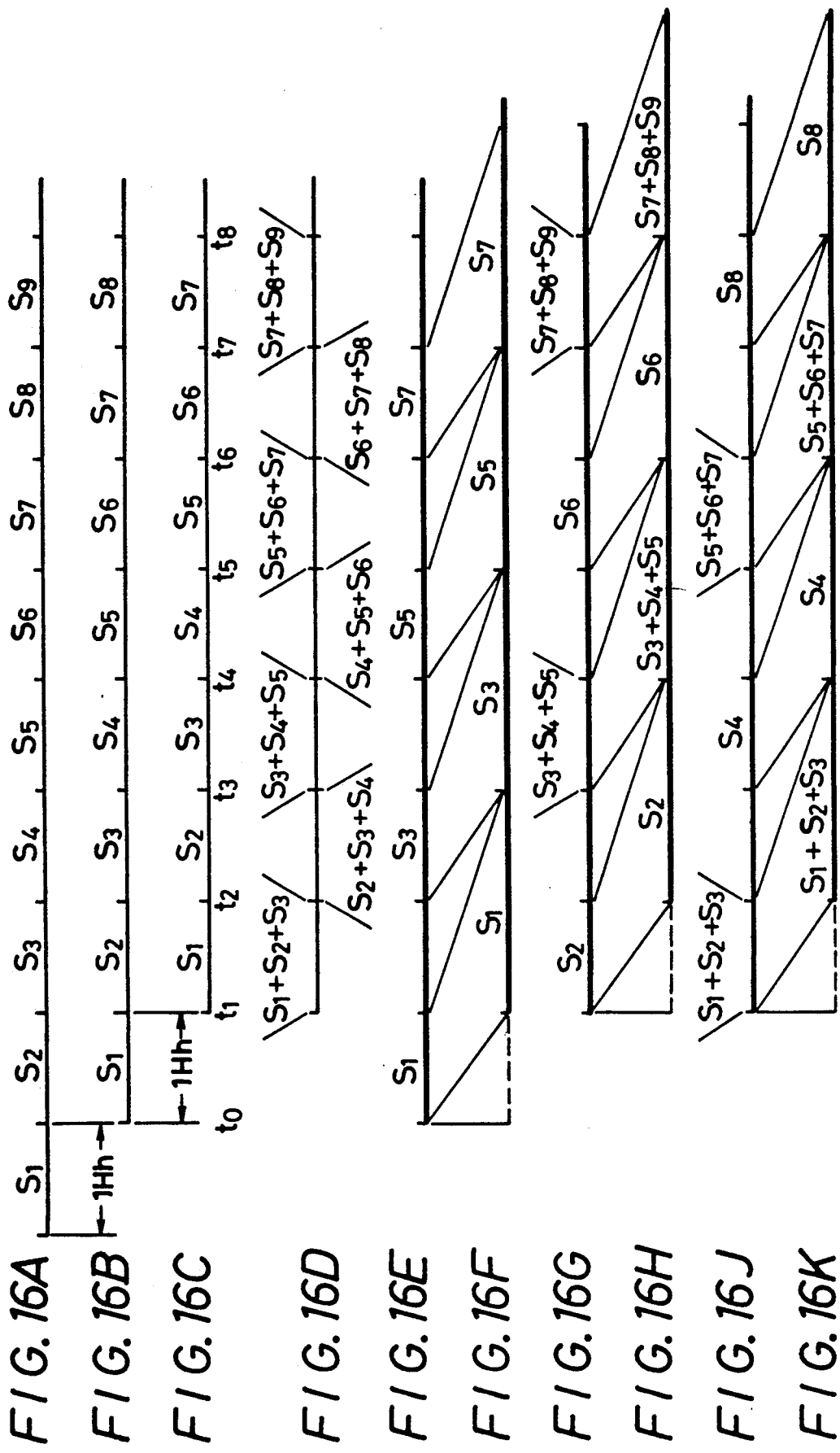
FIGS. 16A to 16K are timing charts used to explain the operation of the main portion of the present invention shown in FIG. 14, respectively.

FIG. 15 illustrates a circuit arrangement of a scan converter circuit 110C used for the sequential scanning/block scanning of the color signal.

Referring to FIG. 15, there are provided first and second 1Hh delay lines 111C and 112C which are connected in series to an input terminal IN. The input and the output of the second delay line 112C are supplied to first and second fixed contacts 126o and 126e of a change-over switch 126, respectively. The output appearing at a movable contact 126c of the change-over switch 126 is supplied to a timebase expander circuit 120C and the output from the timebase expander circuit 120C is delivered to an output terminal OUT. A double-scanning horizontal drive pulse HhD is supplied to the flip-flop circuit 123. Under the control of the output from the first flip-flop circuit 123, the movable contact 126c of the switch 126 is connected to the first fixed contact 126o at the odd-numbered lines of the double-scanning while it is connected to the second fixed contact 126e at the even-numbered lines of the double-scanning.

Two of the above scan converter circuits 110C are used for a pair of color signals, for example, color signals I and Q.

The operation of the scan converter circuit 110Y shown in FIG. 14 will be described next.

During the first field period, television signals Ⓐ, Ⓑ and Ⓒ appearing at the input side of the first delay line 111Y, the junction P between the first and second delay lines 111Y and 112Y and the output side of the second delay line 112Y are each arranged to have a time difference of one horizontal scanning period 1Hh of the double-scanning as shown in FIGS. 16A, 16B and 16C.

In the scan converter circuit 110Y of FIG. 14, the attenuation factors k1, k2 and k3 of the first, second and third attenuators 113, 114 and 115 are all selected to be ⅓, so that, as shown in FIG. 16D, an output Ⓓ from the adder 116 becomes equal to the sum Ⓐ+Ⓑ+Ⓒ of television signals Ⓐ, Ⓑ and Ⓒ developed at the input side of the first delay line 111Y, the junction P and the output side of the second delay line 112Y. In this case, the coefficients (attenuation factors) of ⅓ of the first to third attenuators 113 to 115 are omitted for simplicity.

Considering the respective first, third, fifth . . . horizontal scanning periods starting from time points t0, t2, t4, . . . of the television signal Ⓑ appearing at the junction P which becomes a reference point, as shown in FIG. 16B, there exist television signals $S_1$, $S_3$, $S_5$, . . . corresponding to the respective odd numbered scanning lines of the respective fields of the double-scanning. As shown in FIG. 16B, television signals $S_2$, $S_4$, . . . corresponding to the respective even-numbered scanning lines exist during the horizontal scanning periods starting at time points t1, t3, . . . of the television signal Ⓑ. Further, as shown in FIG. 16D, during the respective horizontal scanning periods which begin at time points t1, t3, . . . of the signal Ⓓ there exist block signals $S_1+S_2+S_3$; $S_3+S_4+S_5$; . . . of the sums of the television signals $S_2$, $S_4$. . . corresponding to the respective even-numbered scanning lines and television signals corresponding to the upper and lower odd-numbered scanning lines.

Accordingly, to the movable contact 117c of the first change-over switch 117 which is changed in position at every scanning line there are intermittently supplied television signals $S_1$, $S_3$, $S_5$, . . . corresponding to the odd-numbered scanning lines during the respective scanning periods which begin at time points t0, t2, t4, . . . as shown in FIG. 16E. The movable contact 118c of the second change-over switch 118 is supplied with the television signals $S_2$, $S_4$, . . . corresponding to the respective even-numbered scanning lines during the respective horizontal scanning periods which begin at time points t1, t3, . . . . . Further, the movable contact 119c of the third change-over switch 119 is supplied with the block signals $S_1+S_2+S_3$; $S_3+S_4+S_5$, . . . corresponding to the respective even-numbered scanning lines during the respective horizontal scanning periods which begin at time points t1, t3, . . . .

The television signals, which are supplied to the respective movable contacts 118c and 119c of the switches 118 and 119, and the timings thereof are as described above. The fourth and fifth change-over switches 121 and 122 supplied with these television signals are switched at every two horizontal scanning lines of the double scanning as mentioned before. Thus, from the fourth change-over switch 121 there are alternately delivered the television signals $S_2$, $S_6$, . . . , each of which corresponds to the single even-numbered scanning line and block signals $S_3+S_4+S_5$; $S_7+S_8+S_9$, . . . , each of which corresponds to three scanning lines at every other one horizontal scanning period as shown in FIG. 16G.

Further, from the fifth change-over switch 122 there are alternately delivered block signals $S_1+S_2+S_3$; $S_5+S_6+S_7$, . . . , each of which corresponds to three scanning lines and television signals S4, S8, . . . , each of which corresponds to the single even-numbered scanning line at every other one horizontal scanning period as shown in FIG. 16J.

In the timebase expander circuit 120Y, as shown in FIGS. 16F, 16H and 16K, the television signals Ⓔ, Ⓖ and Ⓙ supplied thereto are immediately written in a memory (not shown) and then read out therefrom at a reading time period twice as long as the writing time period and thereby converted into interlaced television signals which are continuous in a time. The signals Ⓕ, Ⓗ and Ⓚ are fed from its output terminals 120f, 120h and 120k to the step-switch 125.

During the first field period, the movable contact 125c of the step-switch 125 is connected to its first fixed contact $125_1$ and then moved by one step in the counter-clockwise direction at every vertical drive pulse VD.

Accordingly, during the first and third field periods, from the step-switch 125, there are delivered television signals $S_1$, $S_3$, $S_5$, . . . corresponding to the odd-numbered scanning lines of the double-scanning as shown in FIG. 16F.

During the second field period, from the step-switch 125, there are alternately delivered the television signal $S_2$, . . . corresponding to the even-numbered scanning lines of the double-scanning and the block signal $S_3+S_4+S_5$; . . . each of which corresponds to three scanning lines as shown in FIG. 16H.

During the fourth field period, from the step-switch 125, there are alternately delivered the block signal $S_1+S_2+S_3$; . . . each of which corresponds to the three scanning lines of the double-scanning and the television signal $S_4$, . . . corresponding to the even-numbered scanning line as shown in FIG. 16K.

In the scan converter circuit 110C shown in FIG. 15, the switch 126 is changed in position at every scanning line of the double-scanning as described before, whereby the color signal corresponding to the odd-numbered scanning line of the double-scanning is used as a color signal corresponding to the even-numbered scanning line.

The color signal thus converted is supplied to the timebase expander circuit 120C, in which the timebase thereof is expanded twice. Further, a pair of color signals with timebases expanded are converted into a carrier chrominance signal by means of a known circuit and superimposed upon the output from the scan converter circuit 110Y of FIG. 14.

The afore-mentioned scan conversion processing is repeated at every 4 fields and the transmission signal of the block scanning type shown in FIG. 13 is delivered through the output terminal OUT of the scan converter circuit 110Y to the broadcasting system 3 (shown in FIG. 5).

According to the transmission signal of this embodiment, a flicker occurring when the signal is reproduced by the television receiver of the existing system can be reduced.

How to convert the block scanning into the sequential scanning will be described with reference to FIG. 17.

Figure 17:
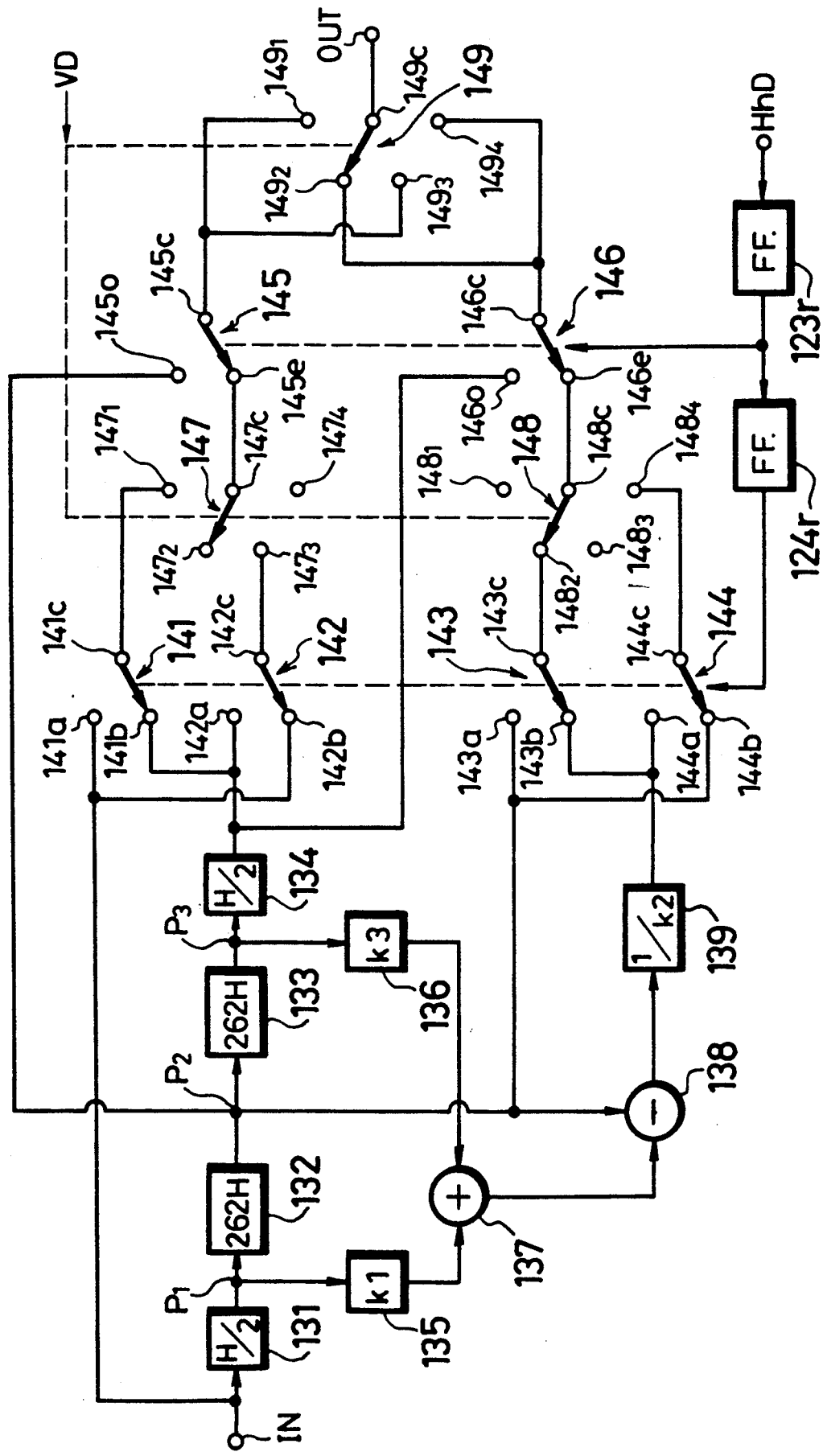
FIG. 17 is a block diagram showing a main portion of a converter for converting block scanning into sequential scanning the present invention.

FIG. 17 illustrates a circuit arrangement of a scan converter circuit 130Y used for such conversion.

Referring to FIG. 17, there are provided H/2 delay lines 131 and 134 and 262H delay lines 132 and 133, respectively. A block scanning television signal applied to an input terminal IN is supplied to the delay line 131 of the first stage. The delay lines 131 to 134 are sequentially connected in series. A junction between the delay lines 131 and 132 is taken as P1 and respective junctions between adjacent ones of the delay lines 132 to 134 are respectively taken as P2 and P3 in turn. The outputs appearing at the first and third junctior's P1 and P3 are supplied respectively through first and second attenuators 135 and 136 to an adder 137, whereas the output appearing at the second junction P2 is supplied to a subtracter 138. The output from the adder 137 is supplied to the subtracter 138, and the output from the subtracter 138 is supplied to an amplifier 139. Attenuation factors k1 and k3 of the first and second attenuators 135 and 136 are respectively selected to be, for example, $\frac{1}{8}$ similarly to those of the first and second attenuators 113 and 114 of FIG. 14. An amplification factor 1/k2 of the amplifier 139 is selected to be, for example, "3".

First to fourth change-over switches 141, 142, 143 and 144 are controlled by an output from a flip-flop circuit 124r in such a manner that they are switched in ganged relation at every two double-scanning horizontal drive pulses HhD.

Fifth and sixth change-over switches 145 and 146 are controlled by an output from a flip-flop circuit 123r such that they are switched in ganged relation at every double-scanning horizontal drive pulse HhD.

The connecting states of the above-mentioned switches 141 and 145 are illustrated on the following table 4.

TABLE 4

| Double-scanning line | Connected state of switch 141 | Connected state of switch 145 |
|---|---|---|
| 1 | Connected to the fixed contact 141a | Connected to the fixed contact 145o |
| 2 | Connected to the fixed contact 141a | Connected to the fixed contact 145e |
| 3 | Connected to the fixed contact 141b | Connected to the fixed contact 145o |
| 4 | Connected to the fixed contact 141b | Connected to the fixed contact 145e |

First, second and third step-switches 147, 148 and 149 are controlled by the vertical drive pulse VD in such a manner that their movable contacts 147c to 149c are connected respectively to their first fixed contacts $147_1$ to $149_1$ during the first field period and are sequentially connected to their second, third and fourth fixed contacts $147_2$ to $149_2$, $147_3$ to $149_3$ and $147_4$ to $149_4$ incrementally during the second, third and fourth field periods. A first fixed contact 141a of the first change-over switch 141 and a second fixed contact 142b of the second change-over switch 142 are connected together to an input terminal IN. The output from the H/2 delay line 134 is commonly supplied to a first fixed contact 142a of the switch 142, a second fixed contact 141b of the change-over switch 141 and a first fixed contact 146o of the sixth change-over switch 146.

A first fixed contact 143a of the third change-over switch 143, a second fixed contact 144b of the fourth change-over switch 144 and a first fixed contact. 145o of the fifth change-over switch 145 are connected to the junction P2 between the delay lines 132 and 133. The output from the amplifier 139 is supplied commonly to a first fixed contact 144a of the switch 144 and a second fixed contact 143b of the switch 143.

Movable contacts 141c and 142c of the switches 141 and 142 are respectively connected to first and third fixed contacts $147_1$ and $147_3$ of the first step-switch 147. Movable contacts 143c and 144c of the switches 143 and 144 are connected to second and fourth fixed contacts $148_2$ and $148_4$ of the second step-switch 148, respectively. As illustrated in FIG. 17, second and fourth fixed contacts $147_2$ and $147_4$ of the first step-switch 147 and first and third fixed contacts $148_1$ and $148_3$ of the second step-switch 148 are connected with no points.

Movable contacts 147c and 148c of both the step-switches 147 and 148 are connected to second fixed contacts 145e and 146e of the fifth and sixth change-over switches 145 and 146, respectively. A movable contact 145c of the switch 145 is commonly connected to first and third fixed contacts $149_1$ and $149_3$ of the third step-switch 149. Also, a movable contact 146c of the switch 146 is commonly connected to second and fourth fixed contacts $149_2$ and $149_4$ of the third step-switch 149, and a movable contact 149c of the third step-switch 149 is connected with an output terminal OUT.

According to this embodiment, a color signal component is eliminated from the transmission signal shown in FIG. 13 by a color signal eliminating circuit which will be described later. The luminance signal is converted in a double-scanning fashion and thereby reconverted into the state in which it is before being timebase-expanded as shown in FIGS. 16E, 16G and 16J. The luminance signal of which the line frequency is doubled is supplied to the scan converter circuit 130Y of FIG. 17.

The operation of a main portion of the embodiment shown in FIG. 17 will be summarized as follows.

In the case of the odd field, the input signal is used as it is as the signal corresponding to the odd-numbered scanning line of the double-scanning. As the signal corresponding to the even-numbered scanning line, a signal corresponding to the single even-numbered scanning line is interpolated from the preceding or succeeding odd field.

In the case of the even field period, a signal corresponding to the odd-numbered scanning line is interpolated from the preceding odd field period as the signal corresponding to the odd-numbered scanning line of the double-scanning. The input signal is directly used as the signal corresponding to the single even-numbered scanning line. Further, for the block signals corresponding to the even-numbered scanning lines, a signal corresponding only to the even-numbered scanning line is separated by using the signal of the lower odd-numbered scanning line of the preceding field and the signal of the upper odd-numbered scanning line of the succeeding field.

In the case of the still picture, since the television signals corresponding to the same scanning lines of each field period become equal, the above-mentioned signal processing ca be carried out.

The operation of the scan converter circuit 130Y of FIG. 17 will hereinafter be described in detail with reference to FIG. 13.

In the following description, the junction P2 between both the 262H delay lines 132 and 133 is taken as a reference point and the respective television signals are suffixes with suffixes denoting indicating the fields and the scanning line of the double-scanning for simplicity.

During the odd field period, for example, the third field period, television signals $S_{31}$, $S_{33}$, $S_{35}$ . . . corresponding to the odd-numbered scanning lines are sequentially supplied to the junction P2, which are delivered through the first fixed contact 145o and the movable contact 145c of the fifth change-over switch 145 and the third fixed contact $149_3$ and the movable contact 149c of the third step-switch 149 to the output terminal OUT.

During the second horizontal scanning period of the third field, a television signal $S_{22}$ of the preceding field and on the same scanning line is generated at the output side of the delay line 134. This signal $S_{22}$ is supplied through the first fixed contact 142a and the movable contact 142c of the second change-over switch 142 to the third fixed contact $147_3$ of the first step-switch 147. During the fourth horizontal scanning period of the third field, a television signal $S_{44}$ corresponding to the succeeding field and on the same scanning line is reached to the input side of the delay line 131. This television signal $S_{44}$ is supplied through the second fixed contact 142b and the movable contact 142c of the second change-over switch 142 to the third fixed contact $147_3$ of the first step-switch 147, similarly.

The television signals $S_{22}$ and $S_{44}$ are both delivered to the output terminal OUT via the movable contact 147c of the step-switch 147; the second fixed contact 145e and the movable contact 145c of the change-over switch 145; and the fixed contact $149_3$ and the movable contact 149c of the third step-switch 149.

During the fifth field period, television signals $S_{51}$, $S_{53}$, $S_{55}$, . . . appear at the junction P2 and are delivered through the first fixed contact 145o and the movable contact 145c of the fifth change-over switch 145 and the first fixed contact $149_1$ and the movable contact 149c of the third step-switch 149 to the output terminal OUT.

During the second and fourth horizontal scanning periods of the fifth field, a television signal $S_{62}$ appearing at the input side of the delay line 131 and the television signal $S_{44}$, developed at the output side of the delay line 134, are supplied through the first and second fixed contacts 141a and 141b of the first change-over switch 141 to the movable contact 141c thereof. Then, these television signals $S_{62}$ and $S_{44}$ are delivered through the first fixed contact $147_1$ and the movable contact 147c of the step-switch 147; the second fixed contact 145e and the movable contact 145c of the change-over switch 145; and the first fixed contact $149_1$ and the movable contact 149c of the step-switch 149 to the output terminal OUT.

Signal processing which is exactly the same as that of the fifth field period is then carried out during the first field period.

During the first and third horizontal scanning periods of the even field, for example, the second field, no television signal reaches the junction P2, and television signals $S_{11}$ and $S_{13}$ corresponding to the preceding field and on the same scanning line reach the output side of the delay line 134. These television signals $S_{11}$ and $S_{13}$ are supplied through the first fixed contact 146o and the movable contact 146c of the sixth change-over switch 146 and the second fixed contact $149_2$ and the movable contact 149c of the third step-switch 149 to the output terminal OUT.

During the second horizontal scanning period of the second field, a television signal $S_{22}$ reaches the junction P2. This television signal $S_{22}$ is delivered to the output terminal OUT via the first fixed contact 143a and the movable contact 143c of the third change-over switch 143; the second fixed contact $148_2$ and the movable contact 148c of the second step-switch 148; the second fixed contact 146e and the movable contact 146c of the change-over switch 146; and the second fixed contact $149_2$ and the movable contact 149c of the step-switch 149.

During the fourth horizontal scanning period of the second field, a block signal $S_{23}+S_{24}+S_{25}$ appears at the junction P2 and is supplied to the subtracter 138. At the same time, a television signal $S_{33}$ of the succeeding field and developed at the junction P1 and a signal $S_{15}$ of the preceding field developed at the junction P3 are respectively supplied to the first and second attenuators 135 and 136, in which they are adjusted in level and then fed to the adder 137.

In accordance with this embodiment, the subtracter 138 carries out the calculation expressed by the following equation (1) to thereby separate a desired television signal $S_{24}$:

$$\frac{S_{23} + S_{24} + S_{25}}{3} - \frac{S_{33} + S_{15}}{3} = \frac{S_{24}}{3} \quad (1)$$

∵ $S_{23}=S_{33}$, $S_{25}=S_{15}$ (still picture)

The separated television signal $S_{24}$ is supplied to the amplifier 139, in which it is adjusted to a predetermined level and then fed through the second fixed contact 143b of the change-over switch 143 to the movable contact 143c thereof. Thus, this television signal $S_{24}$ is delivered to the output terminal OUT via the same way as that of the television signal $S_{22}$, hereinaftter.

During the first and third horizontal scanning periods of the fourth field, television signals $S_{31}$ and $S_{33}$ appear at the output side of the delay line 134 and are delivered through the switch 146, the fourth fixed contact $149_4$ and the movable contact 149c of the step-switch 149 to the output terminal OUT in a substantially similar manner to that of the television signals $S_{11}$ and $S_{13}$ of the second field period.

During the fourth horizontal scanning period of the fourth field, a television signal $S_{44}$ appears at the junction P2 and is is delivered to the output terminal OUT via the second fixed contact 144b and the movable contact 144c of the fourth change-over switch 144; the fourth fixed contact $148_4$ and the movable contact 148c of the second step-switch 148; the second fixed contact 146e and the movable contact 146c of the change over switch 146; and the fourth fixed contact $149_4$ and the movable contact 149c of the step-switch 149.

During the second horizontal scanning period of the fourth field, the block signal $S_{41}+S_{42}+S_{43}$ appears at the junction P2 and is similarly processed by using a television signal $S_{51}$ of the succeeding field developed at the junction P1 and a television signal $S_{33}$ of the preceding field at the junction P3 to thereby separate a desired television signal $S_{42}$ from the block signal $S_{41}+S_{42}+S_{43}$. The separated television signal $S_{42}$ is adjusted in level and then fed through the first fixed contact 144a of the change-over switch 144 to the movable contact 144c thereof. Thereafter, this television signal $S_{42}$ is delivered to the output terminal OUT in the same way as that of the television signal $S_{44}$.

Similar signal processing is carried out in each field, and after the 6th field, the block scanning television signal is converted into the sequential scanning television signal at ever 4 fields.

According to this embodiment, owing to the above mentioned signal processing, original picture information which is composed by block scanning and then transmitted can be correctly separated and reproduced. In this case, the picture quality of the reproduced picture can be prevented from being deteriorated.

In this embodiment, the color signal component is eliminated from the transmission signal shown in FIG. 13 and the real moving picture can be detected only by the luminance signal component.

Subsequently, the color signal eliminating circuit used in this embodiment will be described with reference to FIG. 18.

FIG. 18 illustrates a circuit arrangement of the color signal eliminating circuit of this embodiment.

Referring to FIG. 18, there is shown a color signal eliminating circuit 150. In the color signal eliminating circuit 150, a composite video signal applied to an input terminal IN is supplied commonly to a frame delay line 151, a first adder 152 and a subtracter 153. The output from the frame delay line 151 is supplied to the first adder 152 and the subtracter 153. The output from the first adder 152 is supplied through a first attenuator 154 to a first fixed contact 155o of a change-over switch 155. The output from the subtracter 153 is suplied through a second attenuator 156 and a 263H delay line 157 to a second adder 158. The attenuation factors of the first and second attenuators 154 and 156 are both selected to be ½. The second adder 158 is supplied with the input video signal from the input terminal IN and the output from the second adder 158 is supplied to a second fixed contact 155e of the change-over switch 155. The output appearing at a movable contact 155c of the change-over switch 155 is delivered to an output terminal OUT. A vertical drive pulse VD is supplied to a flip-flop circuit 159, and under the control of the output from this flip-flop circuit 159, the movable contact 155c of the change-over switch 155 is connected to the first fixed contact 155o during the odd field period and connected to the second fixed contact 155e during the eve field period.

The operation of the color signal eliminating circuit 150 will now be described with reference to FIG. 13.

In the case of the odd field period, television signals $S_{31}$, $S_{33}$, . . . corresponding to the respective scanning lines of, for example, the third field are added with television signals $S_{11}$, $S_{13}$, . . of two vertical periods before, for example, television signals $S_{11}$, $S_{13}$, . . . of the first field by the first adder 152 and the color signal components of opposite phases shown in FIG. 13 cancel each other out, thus only the luminance signal component being obtained.

In the case of the even field, with respect to the block signal $S_{41}+S_{42}+S_{43}$ of the (246)th scanning line of, for example, the fourth field, a difference component $S_{11}-S_{31}$ of a television signal of 263H periods before, that is, the television signal $S_{31}$ of the third field and the first line and a television signal of two vertical periods before, that is, the television signal $S_{11}$ of the first field and the first line is calculated by the subtracter 153. In other words, a color signal component of negative phase is calculated. Then, in the second adder 158, the calculated color signal component of the negative phase and a color signal component of positive phase of the block signal $S_{41}+S_{42}+S_{43}$ cancel each other out to thereby produce only the luminance signal component.

In like manner, with respect to the television signal $S_{44}$ of the (265)th line in the fourth field period, a difference component $S_{13}-S_{33}$ of the television signal of 263H periods before, that is, the television signal $S_{33}$ of the second line in the third field and a television signal of two vertical periods before, that is, the television signal $S_{13}$ of the second line in the first field, in other words, the color signal component of positive phase is calculated by the subtracter 153. Then, this color signal component of positive phase and the color signal component of negative phase of the television signal $S_{44}$ cancel each other out in the second adder 158 to thereby produce only the luminance signal component.

The above-mentioned operations are alternately repeated at every scanning line in the same field period. Further, the phase of the color signal component is inverted at every frame and a similar operation is repeated.

A real moving picture detector for this embodiment will be described with reference to FIGS. 19 to 22.

FIG. 19 shows an embodiment of a real moving picture detecting circuit 160. In the real moving picture detecting circuit 160, a 262H delay line 161, a 1H delay line 162 and a 262H delay line 163 are connected in series to an input terminal IN. Respective outputs appearing at a junction Q1 between the delay lines 161 and 162 and at a junction Q2 between the delay lines 162 and 163 are respectively supplied through inversion attenuators 164 and 165 to an adder 167 whereas the output from the delay line 163 is directly supplied to the adder 167. The input to the delay line 161 is supplied through an attenuator 168 to a subtracter 169 and the output from the subtracter 169 is supplied to a first fixed contact 170a of a change-over switch 170.

The outputs developed at the junctions Q1 and Q2 and the output from the delay line 163 are supplied respectively through attenuators 174, 175 and 176 to an adder 177. The input to the delay line 161 is directly supplied to a subtracter 179 which also receives the output from the adder 177. Then, the output from the subtracter 179 is supplied to a second fixed contact 170b of the change-over switch 170.

A horizontal drive pulse HD and a vertical drive pulse VD are supplied to a control circuit 180. Under the control of the output from the control circuit 180, the movable contact 170c of the change-over switch 170 is connected to the first fixed contact 170a for the odd-numbered scanning line of the second field and the even-numbered scanning line of the fourth field, whereas it is connected to the second fixed contact 170b for the even-numbered scanning line of the second field and the odd-numbered scanning line of the fourth field.

In this embodiment, the attenuation factors of the attenuators 164, 165, 168, 174, 175 and 176 are all selected to be $\frac{1}{3}$.

There are further provided a double-scanning processor circuit 181 and a maximum value selector circuit 182. The output from the change-over switch 170 is commonly supplied to first input terminals 181a and 182a of the double scanning processor circuit 181 and the maximum value selector circuit 182 and is also supplied through a 1H delay line 183 to a second input terminal 182b of the maximum value selector circuit 182. The output from the maximum value selector circuit 182 is supplied to a second input terminal 181b of the double scanning processor circuit 181. The output from the double scanning processor circuit 181 is supplied to a first fixed contact 184o of a change-over switch 184 and is also supplied through a 1V delay line 185 to a second fixed contact 184e of the change-over switch 184. The output appearing at a movable contact 184c of the change-over switch 184 is delivered to an output terminal OUT.

The vertical drive pulse VD is supplied to a flip-flop circuit 186, and under the control of the output from this flip-flop circuit 186, the movable contact 184c of the change-over switch 184 is connected to the first fixed contact 184o during the odd field period and connected to the second fixed contact 184e during the even field period.

The operation of the real moving picture detecting circuit 160 shown in FIG. 19 will be summarized as follows.

Figure 20:
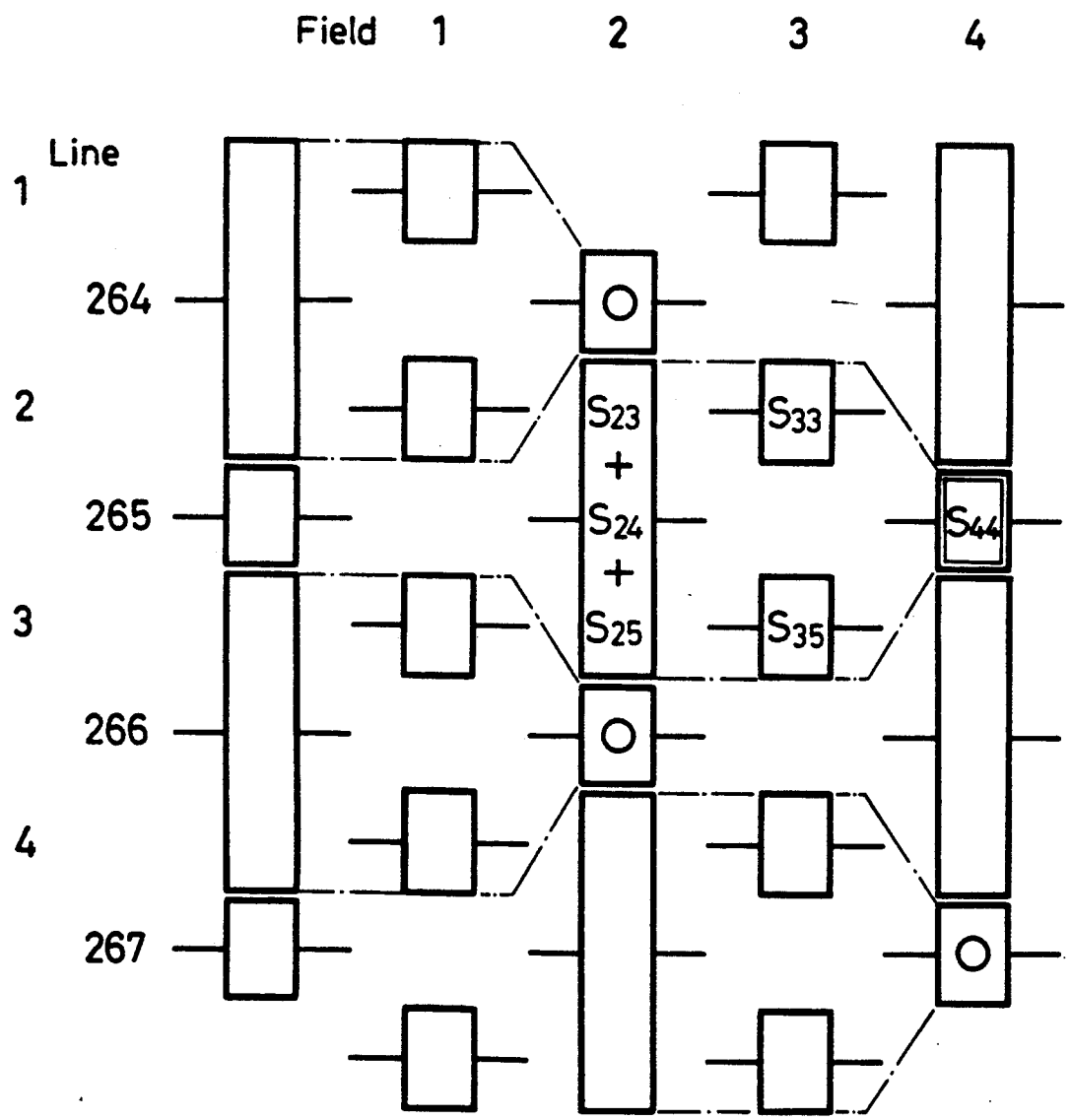
FIGS. 20, 21 and 22 are conceptual diagrams used to explain the operation of the main portion of the present invention shown in FIG. 19.

In the case of the television signal corresponding to the single line of the double-scanning during the even field period, the difference between this television signal and the television signals on the upper and lower scanning lines on the preceding field and also the difference between the above television signal and the block signal of the same scanning line in the further-preceding field are detected as shown in FIG. 20 forming a conceptual diagram.

Figure 21:
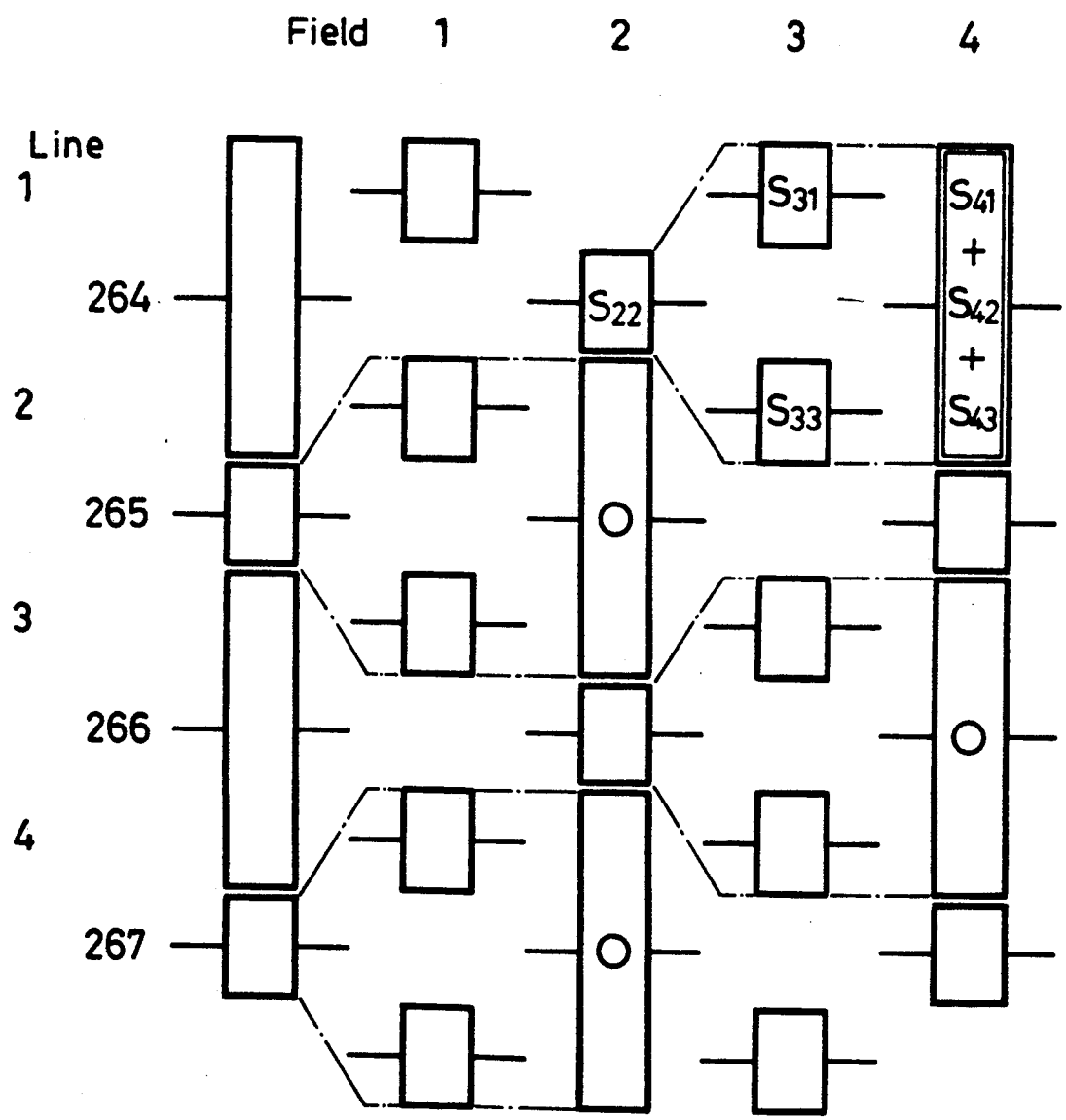

In the case of the block signal of the even field period, the difference between the block signal and the television signals corresponding to three scanning lines in the double-scanning is detected over the preceding 2 fields as shown in FIG. 21 forming a conceptual diagram.

Now, the operation of the real moving picture detecting circuit 160 shown in FIG. 19 will be described with reference to FIGS. 20 to 22.

At the time point when a television signal corresponding to a single scanning line in the even field period, for example, a television signal $S_{44}$ of the second scanning line in the fourth field period as shown in FIG. 20, exists at the input terminal IN of the real moving picture detecting circuit 160, television signals $S_{35}$ and $S_{33}$ of the third and second scanning lines of the immediately previous field exist at the junctions Q1 and Q2. Whereas, a block signal $S_{23}+S_{24}+S_{25}$ of the second scanning line of the field prior fields exists at the output side of the delay line 163.

This block signal $S_{23}+S_{24}+S_{25}$ is supplied to the adder 167 and the television signals $S_{35}$ and $S_{33}$, whose levels are adjusted by the inversion attenuators 164 and 165, are also supplied to the adder 167, so that the adder 167 produces an output $SM_{167}$ expressed by the following equation (2):

$$SM_{167} = \frac{S_{23} + S_{24} + S_{25}}{3} - \frac{S_{35} + S_{33}}{3} \qquad (2)$$

The output from this adder 167 and the present television signal at the input terminal IN whose level is adjusted by the attenuator 168, are supplied to the subtracter 169 with the result that the subtracter 169 produces an output $D_{169}$ expressed by the following equation (3):

$$D_{169} = \frac{S_{44}}{3} + \frac{S_{35} + S_{33}}{3} - \frac{S_{23} + S_{24} + S_{25}}{3} \qquad (3)$$

In the case of the still picture, since $S_{44}=S_{24}$, $S_{35}=S_{25}$ and $S_{33}=S_{23}$ are established, $D_{169}=0$ is satisfied.

In this way, the adder 167 generates a field difference output and the subtracter 169 generates a frame difference output, respectively. Consequently, when the output from the adder 167 is "1", the picture is judged as a, real moving picture (live picture), whereas when it is "0", the picture is judged as a still picture.

At the time point when a block signal of the even field period, for example, a block signal $S_{41}+S_{42}+S_{43}$ of the first scanning line in the fourth field as shown in FIG. 21 exists at the input terminal IN, television signals $S_{33}$ and $S_{31}$ of the second and first scanning lines in the next previous field exist at the junctions Q1 and Q2, respectively. Also, a television signal $S_{22}$ of the first scanning line in the field two fields before exists at the output side of the delay line 163. These television signals $S_{33}$, $S_{31}$ and $S_{22}$ are adjusted in level by the attenuators 174, 175 and 176 and then fed to the adder 177 which therefore produces an output $SM_{177}$ expressed by the following equation (4):

$$SM_{177} = \frac{S_{22} + S_{31} + S_{33}}{3} \qquad (4)$$

The output from the adder 177 and the present block signal $S_{41}+S_{42}+S_{43}$ at the input terminal IN are supplied to the subtracter 179 so that the subtracter 179 produces an output $D_{179}$ expressed by the following equation (5):

$$D_{179} = \frac{S_{41} + S_{42} + S_{43}}{3} - \frac{S_{22} + S_{31} + S_{33}}{3} \qquad (5)$$

In the case of the still picture, since $S_{41}=S_{31}$, $S_{42}=S_{22}$ and $S_{43}=S_{33}$ are established, $D_{179}=0$ is satisfied.

In this way, the subtracter 179 produces the field difference output and the frame difference output. Thus, when the output from the subtracter 179 is "1", the television signal is judged as the real moving picture whereas when it is "0", the television signal is judged as the still picture.

The above-mentioned outputs (real moving picture detecting signals) from the subtracters 169 and 179 are switched at every scanning line of the even field by the change-over switch 170 and then fed to the double scanning processor circuit 181 and the maximum value selector circuit 182. In this maximum value selector circuit 182, one of the larger detecting signals of the real moving picture detecting signals of the present scanning line and the real moving picture detecting signal of the preceding scanning line is selected as shown by open circles shown in FIG. 22 and the selected real moving picture detecting signal is used as a real moving picture detecting signal of the interpolated scanning line as shown by the solid circles in FIG. 22. The real moving picture detecting signal of the interpolated scanning line becomes "1" when the real moving picture detecting signal of one of the upper and lower scanning lines is "1". In the double scanning processor circuit 181, the signal is processed in such a fashion that the real moving picture detecting signal of the present scanning line supplied to the first input terminal 181a thereof and the real moving picture detecting signal of the interpolated scanning line supplied to the second input terminal 181b thereof are generated alternately.

Figure 22:
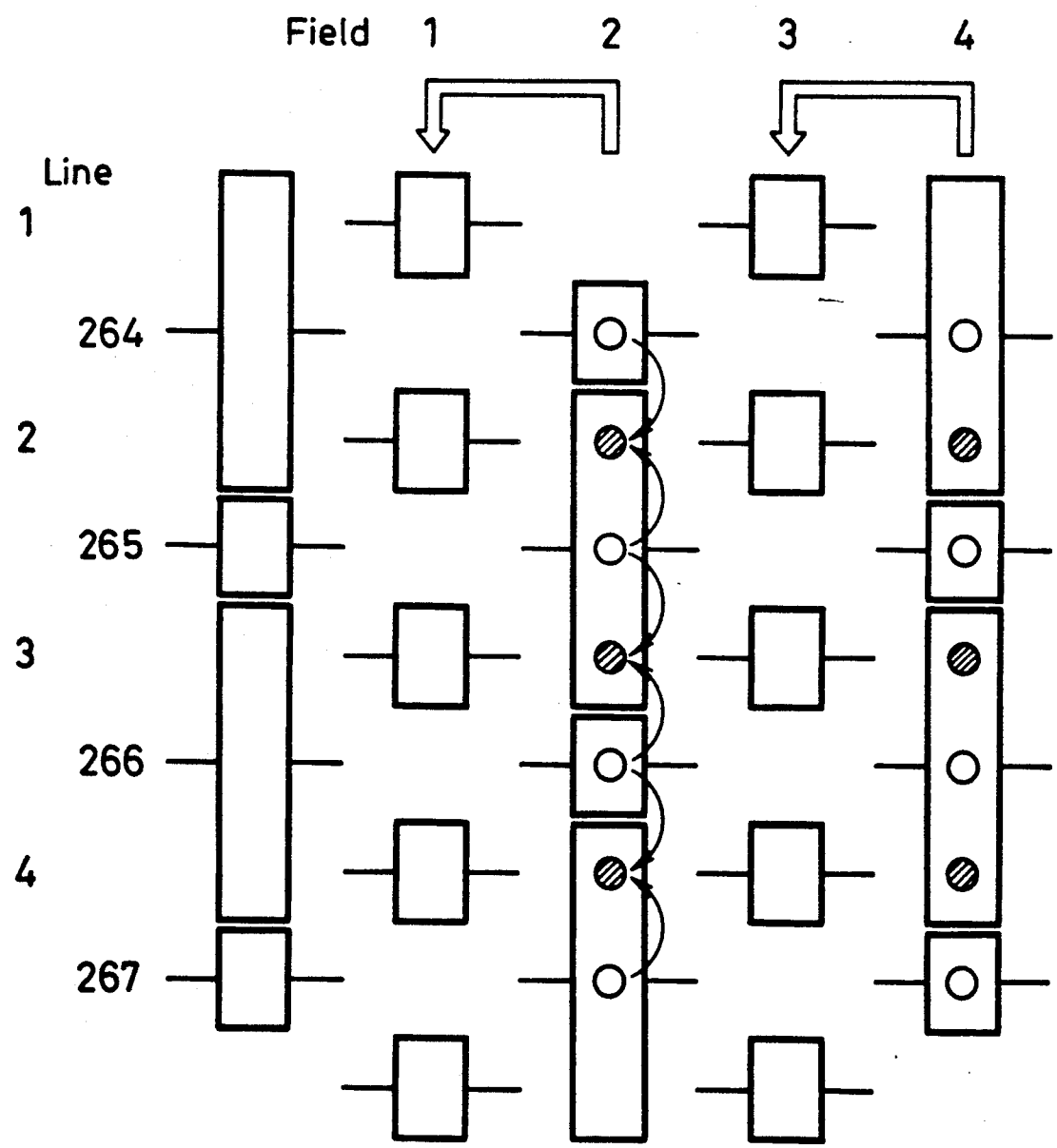

Further, in this embodiment, since the block signal is transmitted only in the even field period as described before, a real moving picture detecting signal of the succeeding even field is directly employed as the real moving picture detecting signal of the odd field period, as shown by open arrows in FIG. 22.

However, since such signal processing is impossible in the practical circuit, a output from the double scanning processor circuit 181 is delayed by a delay time corresponding to one field period by the delay line 185 in this embodiment.

At the same time, the luminance signal supplied from the color signal eliminating circuit 150 in FIG. 18 to the scan converter circuit 130Y of FIG. 17 is delayed by one field period.

A standard luminance signal used for the real moving picture and the color signal for the real moving picture and the still picture are similarly delayed by a delay time corresponding to one field period.

As set forth above, according to this embodiment, the field difference output can be obtained by using the signal of on block and the real moving picture can be detected with high accuracy.

Still further embodiment of this invention will be described hereinafter.

Figure 23:
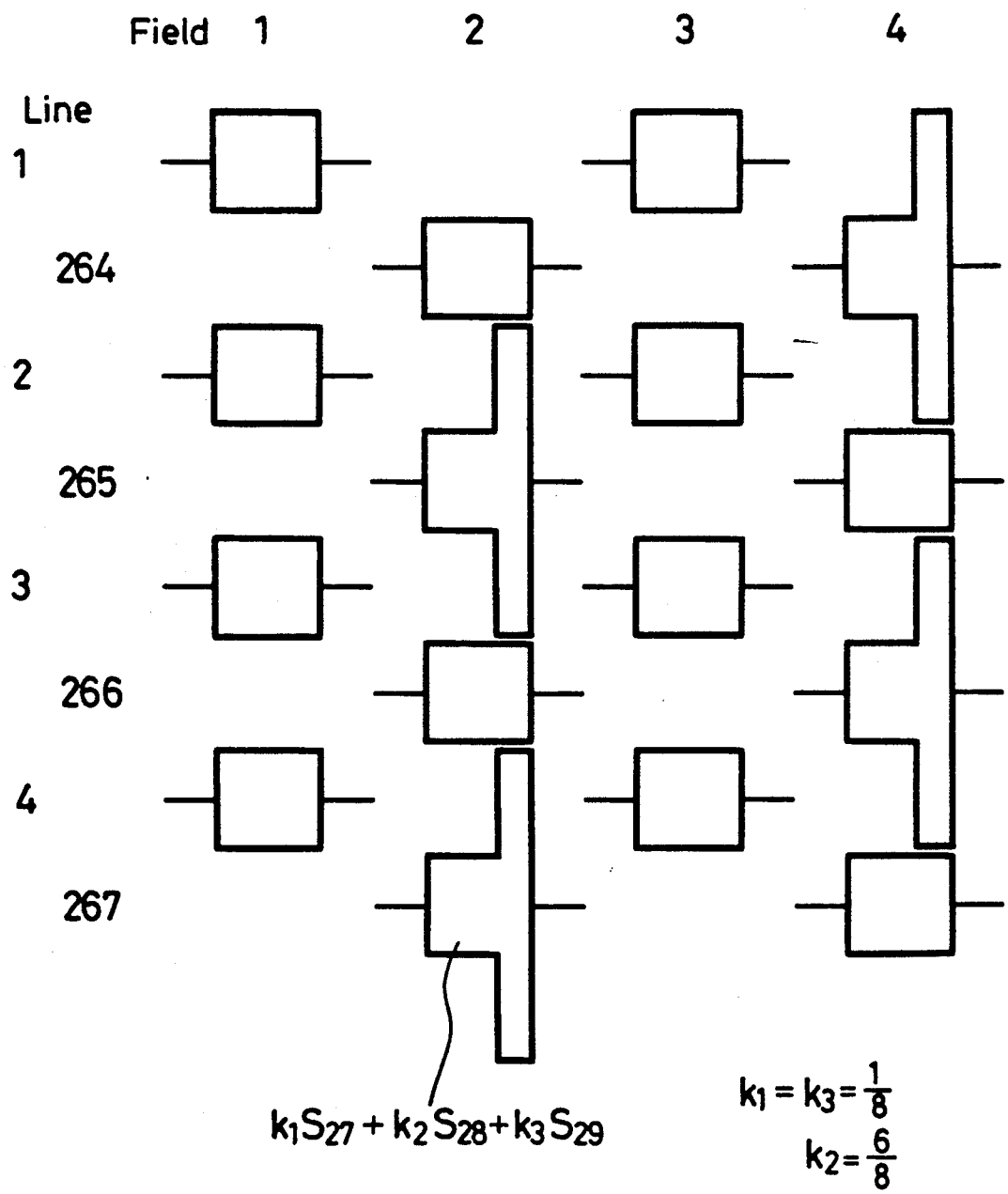
FIG. 23 is a conceptual diagram showing a transmitting signal used in the still further embodiment of the television signal processing system according to the present invention.

While the block signal of the even field period is formed by equally integrating television signals corresponding to the three scanning lines of the double scanning in the afore-mentioned embodiment, it is possible to form the block signal of the even field period by weighting the television signals corresponding to the three scanning lines as shown in FIG. 23.

In this embodiment, the block signal is formed as, for example, of $(S_{27}+6S_{28}+S_{29})/8$. In this case, the attenuation factors of the respective attenuators shown in FIGS. 14, 17 and 19 become $k1=\frac{1}{8}$, $k2=6/8$ and $k3=\frac{1}{8}$ and the amplification factor of the amplifier 139 in FIG. 17 is selected as $1/k2=8/6$.

Accordingly, the line flicker occurring on the reproduced picture of a conventional television receiver can be reduced more and a remarkable visual effect can be achieved.

According to the present invention, as described above in detail, since the television signals corresponding to a plurality of scanning lines continuous in the vertical direction are formed into the single block signal of one field and alternately transmitted as a plurality of block signals over a plurality of other fields continuous from a time standpoint, with compatibility for the existing standard television signal transmitting system, a real moving picture can be detected accurately and the block scanning can be properly converted into sequential scanning without deteriorating the picture quality of the reproduced picture. Thus, the vertical resolution of the reproduced picture can be improved and the line flicker occurring in the reproduced picture by the television receiver of the existing television signal transmitting system can be eliminated.

The above description is given on the preferred embodiments of the invention but it will be apparent that many modifications and variations could be effected by one skilled in the art without departing from the spirit or scope of the novel concepts of the invention so that the scope of the invention should be determined by the appended claims only.

We claim as our invention:

1. A television signal processing system comprising:
   a) receiving means for receiving a television signal having a plurality of fields, each having a plurality of scanning lines;
   b) combining means connected to the receiving means for combining a predetermined number of the scanning lines in one field and transmitting the combined output as one scanning line of the one field; and
   c) dividing means connected to the receiving means for dividing the same number (of lines) as the predetermined number of scanning lines in another field, corresponding to the predetermined number of scanning lines in the one field, into a plurality of groups and transmitting them as a plurality of scanning lines of the other field.

2. A television signal processing system according to claim 1, wherein the received television signal is non-interlaced and the television signal to be transmitted is interlaced.

3. A television signal processing system according to claim 2, wherein the received television signal is an output from a sequentially-scanning television camera.

4. A television signal processing system according to claim 1, further comprising means for receiving the transmitted television signal and scan-converting the same into a non-interlaced signal and double scanning monitor means for monitoring the non-interlaced signal.

5. A television signal processing system according to claim 4, wherein the transmitted television signal is a luminance signal in a lower frequency band.

6. A television signal processing system according to claim 4, further comprising motion detecting means for detecting motion in the image represented by the transmitted television signal and means for interpolating the transmitted television signal in accordance with an output from the motion detecting means.

7. A television signal processing system according to claim 6, wherein the interpolating means interpolates the transmitted television signal on the basis of the signals within one field when the motion is detected by the motion detecting means.

8. A television signal processing system according to claim 6, wherein the interpolating means interpolates the transmitted television signal on the basis of the signals of a plurality of continuous fields when motion is not detected by the motion detecting means.

9. A television signal processing system accoding to claim 1, wherein the combining means and dividing means combine and divide the predetermined number of scanning lines repeatedly and cyclically at a predetermined number of fields.

10. A television signal processing system accoding to claim 1, wherein the dividing means divides the same number (of lines) as the predetermined number of scanning lines in a plurality of continuous fields corresponding to the predetermined number of scanning lines in the one field.

11. A television signal processing system accoding to claim 10, wherein the ratio of combining the predetermined number of the scanning lines is varied by the position of the scanning lines.

12. A television signal processing system according to claim 4, wherein the television signal transmitted by the combining means and the dividing means is a block scanning type signal wherein some corresponding scan line signals are the same from field to field and the scan-converting means which receives the block scanning type signal is a block scanning to sequential scanning converting means and comprises:
   a) selecting means for selecting certain ones of the same corresponding scan lines and subtracting them from other scan lines to output a plurality of scan lines corresponding to their original form as received by the receiving means and a plurality of interpolated scan lines; and
   b) time base compressing means for receiving the output of the selecting means and alternately time base compressing the original form scan lines and the interpolated scan lines as sequential, double scanning lines.

13. A method for processing a television signal comprising the steps of:
   a) receiving a television signal having a plurality of scanning lines;
   b) combining a predetermined number of scanning lines in one field of the received television signal and transmitting the combined output as one scanning line of the one field; and
   c) dividing the same number (of lines) as the predetermined number of scanning lines in another field of the received television signal corresponding to the predetermined number of scanning lines in the one field into a plurality of groups and transmitting them as a plurality of scanning lines of the other field.

14. A method for processing a television signal according to claim 13, wherein the received television signal is non-interlaced and the television signal to be transmitted is interlaced.

* * * * *